United States Patent
Shin

(10) Patent No.: US 10,609,439 B2
(45) Date of Patent: Mar. 31, 2020

(54) MOBILE TERMINAL AND CONTROL METHOD THEREOF

(71) Applicant: LG ELECTRONICS INC., Seoul (KR)

(72) Inventor: Donghyun Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/753,104

(22) PCT Filed: Nov. 9, 2015

(86) PCT No.: PCT/KR2015/011984
§ 371 (c)(1),
(2) Date: Feb. 15, 2018

(87) PCT Pub. No.: WO2017/047868
PCT Pub. Date: Mar. 23, 2017

(65) Prior Publication Data
US 2018/0359512 A1 Dec. 13, 2018

(30) Foreign Application Priority Data
Sep. 17, 2015 (KR) .......................... 10-2015-0131686

(51) Int. Cl.
*H04N 21/422* (2011.01)
*H04M 1/725* (2006.01)
(Continued)

(52) U.S. Cl.
CPC ...... *H04N 21/42209* (2013.01); *H04M 1/725* (2013.01); *H04M 1/72522* (2013.01);
(Continued)

(58) Field of Classification Search
CPC ....... H04N 21/42209; H04N 21/42216; H04N 21/47214; H04N 21/4788; H04N 21/4126;
(Continued)

(56) References Cited

U.S. PATENT DOCUMENTS

2007/0250895 A1   10/2007  Yamada
2010/0064307 A1 *  3/2010  Malhotra ............... H04H 60/80
                                                                725/24
(Continued)

FOREIGN PATENT DOCUMENTS

CN      103428558 A      12/2013
CN      104854586 A       8/2015
(Continued)

*Primary Examiner* — Benjamin R Bruckart
*Assistant Examiner* — Aklil M Tesfaye
(74) *Attorney, Agent, or Firm* — Birch, Stewart, Kolasch & Birch, LLP

(57) ABSTRACT

A mobile terminal including a memory for storing identification information corresponding to at least one external mobile terminal, a communication unit for receiving first EPG data from an external server or first external display device, a display for displaying EPG on the basis of the received first EPG data and a controller configured to: control the display to display identification information corresponding to the at least one external mobile terminal according to a first command, transmit to the first external display device, a signal for a viewing reservation of the specific program according to the first command, and control the communication unit to transmit to a first external mobile terminal corresponding to specific identification information, first viewing reservation information on the specific program according to a second command for selecting the specific identification information from the displayed identification information.

20 Claims, 17 Drawing Sheets

(51) Int. Cl.
  *H04N 21/41* (2011.01)
  *H04N 21/4788* (2011.01)
  *H04N 21/472* (2011.01)

(52) U.S. Cl.
  CPC ..... *H04N 21/4122* (2013.01); *H04N 21/4126* (2013.01); *H04N 21/42216* (2013.01); *H04N 21/4788* (2013.01); *H04N 21/47214* (2013.01)

(58) Field of Classification Search
  CPC .......... H04N 21/4122; H04M 1/72522; H04M 1/725
  See application file for complete search history.

(56) References Cited

U.S. PATENT DOCUMENTS

| | | | | |
|---|---|---|---|---|
| 2011/0145852 A1* | 6/2011 | Lee | ................. | H04N 21/25816 725/25 |
| 2011/0246908 A1* | 10/2011 | Akram | ........... | H04N 21/234318 715/752 |
| 2013/0133005 A1* | 5/2013 | Sakai | ................... | H04N 5/4403 725/46 |
| 2013/0246522 A1* | 9/2013 | Bilinski | ............. | H04N 21/4758 709/204 |
| 2014/0245351 A1 | 8/2014 | Ford et al. | | |
| 2014/0282712 A1 | 9/2014 | Unnikrishnan et al. | | |
| 2014/0317660 A1* | 10/2014 | Cheung | .............. | H04N 21/6175 725/44 |
| 2015/0195620 A1 | 7/2015 | Buchner et al. | | |
| 2015/0208130 A1* | 7/2015 | Ishii | ....................... | G01C 21/34 386/297 |
| 2016/0150282 A1* | 5/2016 | Hirabayashi | ....... | H04N 21/4222 725/33 |

FOREIGN PATENT DOCUMENTS

| | | |
|---|---|---|
| JP | 2008-252433 A | 10/2008 |
| KR | 10-2011-0115837 A | 10/2011 |
| KR | 10-2013-0005169 A | 1/2013 |
| KR | 10-2013-0024131 A | 3/2013 |
| KR | 10-1372100 B1 | 3/2014 |
| KR | 10-1509258 B1 | 4/2015 |

* cited by examiner

MOBILE TERMINAL AND CONTROL METHOD THEREOF

CROSS REFERENCE TO RELATED APPLICATIONS

This application is the National Phase of PCT International Application No. PCT/KR2015/011984, filed on Nov. 9, 2015, which claims priority under 35 U.S.C. 119(a) to Patent Application No. 10-2015-0131686, filed in Republic of Korea, filed on Sep. 17, 2015, all of which are hereby expressly incorporated by reference into the present application.

TECHNICAL FIELD

The present invention relates to a mobile terminal and a control method therefor.

BACKGROUND ART

Not only various standing devices such as a Personal Computer (PC) and a television (TV), but also various mobile devices such as a smart phone and a tablet PC have been remarkably developed. Although the standing devices and the mobile devices have been developed in different ways in their unique regions, their unique regions become ambiguous in accordance with the recent boom of digital convergence.

In most cases, the standing device such as TV is controlled using a preset application (for example, remote controller application) stored in the mobile terminal.

However, a user may register a viewing reservation for a specific program through the mobile terminal but there is inconvenience in that the viewing reservation cannot be shared with another mobile terminal.

DISCLOSURE

Technical Problem

The present invention has been devised to solve the above status or problem, and an object of the present invention is to provide a mobile terminal that shares a viewing reservation set for a specific program of a display device with another mobile terminal.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

Various methods for a mobile terminal and a control method therefor will be disclosed in this specification.

A mobile terminal, according to one embodiment of the present invention, which is communicatively connected with a first external display device, comprises a memory for storing identification information corresponding to at least one external mobile terminal; a communication unit for receiving first electronic program guide (EPG) data from an external server or the first external display device; a display unit for displaying EPG on the basis of the received first EPG data; and a controller, wherein the controller controls the display unit to display identification information corresponding to the at least one external mobile terminal in accordance with a first command for reserving group viewing of a specific program from at least one program included in the EPG, and transmits, to the first external display device, a signal for a viewing reservation of the specific program in accordance with the first command, and controls the communication unit to transmit, to a first external mobile terminal corresponding to specific identification information, first viewing reservation information on the specific program in accordance with a second command for selecting the specific identification information from the displayed identification information.

A control method for a mobile terminal according to one embodiment of the present invention comprises the steps of being communicatively connected with a first external display device; receiving first electronic program guide (EPG) data from an external server or the first external display device; displaying EPG on the basis of the received first EPG data; displaying identification information corresponding to at least one external mobile terminal, which is previously stored in a memory, in accordance with a first command for reserving group viewing of a specific program from at least one program included in the EPG, and transmitting, to the first external display device, a signal for a viewing reservation of the specific program; and transmitting, to a first external mobile terminal corresponding to specific identification information, first viewing reservation information on the specific program in accordance with a second command for selecting the specific identification information from the displayed identification information.

It will be appreciated by persons skilled in the art that that the technical solutions that could be achieved with the present invention are not limited to what has been particularly described hereinabove and other technical solutions of the present invention will be more clearly understood from the following detailed description.

Advantageous Effects

Advantageous effects of a mobile terminal and a control method therefor according to the present invention are as follows.

According to at least one of the embodiments of the present invention, it is advantageous that a viewing reservation set for a specific program of a display device using a mobile terminal may be shared with another mobile terminal.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
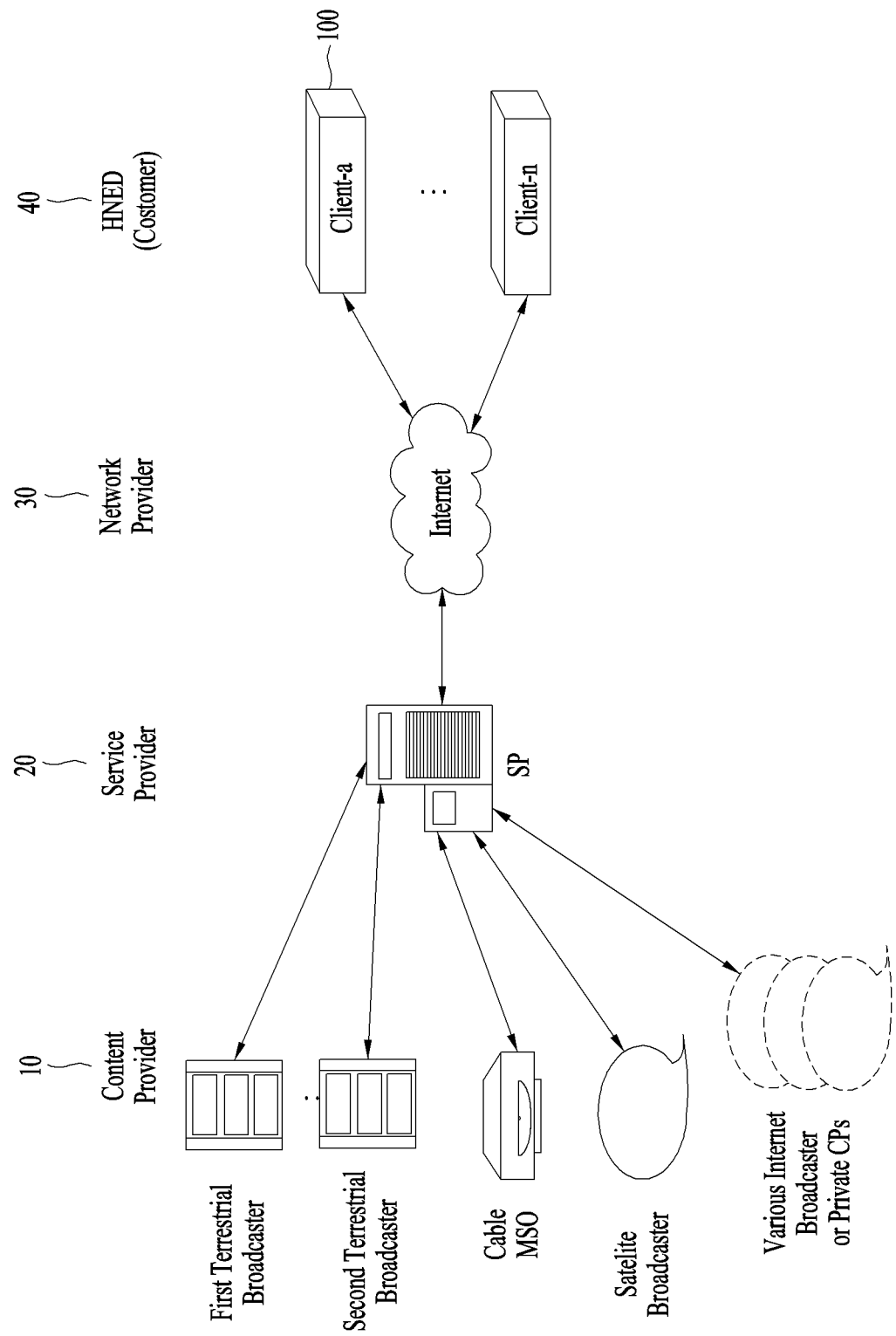
FIG. 1 is a brief view illustrating a service system that includes a digital device according to one embodiment of the present invention.

Description will now be given in detail according to exemplary embodiments disclosed herein, with reference to the accompanying drawings. For the sake of brief description with reference to the drawings, the same or equivalent components can be provided with the same reference numbers, and description thereof will not be repeated.

In general, a suffix such as "module" and "unit" can be used to refer to elements or components. Use of such a suffix herein is merely intended to facilitate description of the specification, and the suffix itself is not intended to give any special meaning or function. Meanwhile, such an ordinal number as 'first-', 'second', 'third' and the like can have a meaning of an order. Yet, the terminologies can be used for the purpose of distinguishing one component from another component capable of being overlapped with each other. In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings.

As such, the present disclosure should be construed to extend to any alterations, equivalents and substitutes in addition to those which are particularly set out in the accompanying drawings.

A digital device according to the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive the prescribed data. Examples of the digital device can include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIG. 2 and mobile device is used in FIG. 3 depicting the digital device. Further, the digital device in this specification can be referred to configuration having only a panel, set-top box (STB), or a set including the entire system.

Moreover, the wired or wireless network described in this specification can refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device.

Meanwhile, the digital device can perform intelligent functions such as receiving broadcasting program, operating computer functions, and supporting at least one external input, and by being connected through the network wired or wirelessly, the digital device can support e-mail functions, web browsing functions, banking, gaming, and executing applications. The digital device can further include an interface for any one of input or control means (hereinafter referred as "input means") supporting handwriting input, touch-screen, and space remote control.

Furthermore, the digital device can use standard operating system (OS), however, the digital device described in this specification and the embodiments, uses Web OS. Therefore, the digital device can perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input means or digital devices, capable of transmitting and receiving data through wired or wireless network connected to and from the digital device. For example, the external input includes High Definition Multimedia Interface (HDMI), game devices such as playstation or X-Box, smart phone, tablet PC, printing device such as pocket photo, digital devices such as smart TV and blue-ray device.

The "server" referred to as in this application, includes digital device or system capable of transmitting and receiving data to and from client, and can also be referred to as a processor. For example, the server can be servers providing services such as portal server providing web page, web content or web service, advertising server providing advertising data, content server, Social Network Service (SNS) server providing SNS service, service server providing service to manufacturer, Multichannel Video Programming Distributor (MVPD) providing Video on Demand or streaming service, and service server providing pay services.

In this application, when application is described for the convenience of explanation, the meaning of application in the context can include services as well as applications. In addition, the application may refer to a web application according to the web OS platform.

In the following description, various embodiments according to the present invention are explained with reference to attached drawings.

FIG. 1 illustrates a service system including a digital device according to an embodiment of the present invention.

Referring to FIG. 1, examples of a service system comprising a digital device can include a content provider (CP) 10, a service provider (SP) 20, a network provider (NP) 30, and a home network end user (HNED) (Customer) 40. The HNED 40 includes a client 100, that is, a digital device.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Each of the CP 10, SP 20 and NP 30, or a combination thereof can be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity. The service or service data includes an internal service or an application as well as a service or an application received from the outside, and such a service or an application includes a service for a Web OS-based client 100 or application data.

According to the present invention, a digital device can include a manager to manage a display window of the digital device and to generate and to transmit a plurality of status data of the digital device to a controller and the controller to receive a first signal from a first application requesting registration as an application voter, to transmit a second signal requesting a confirmation related to execute a second application to the first application when first status data is received from a service interface, to receive a response to the second signal from the first application, and to execute the second application to enter a screensaver mode based on the received response.

Figure 2:
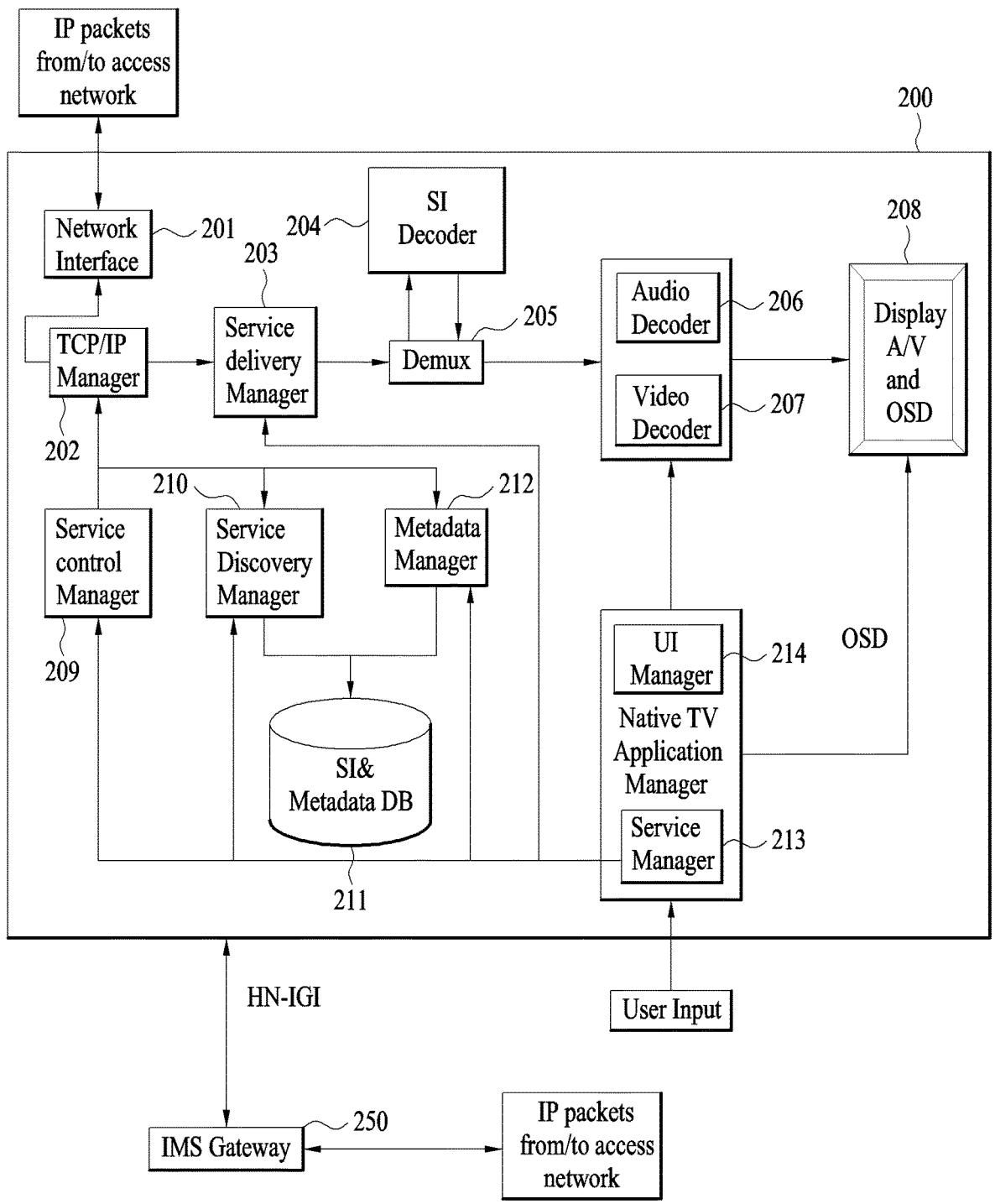
FIG. 2 is a schematic block diagram illustrating a digital device according to one embodiment of the present invention.
Figure 3:
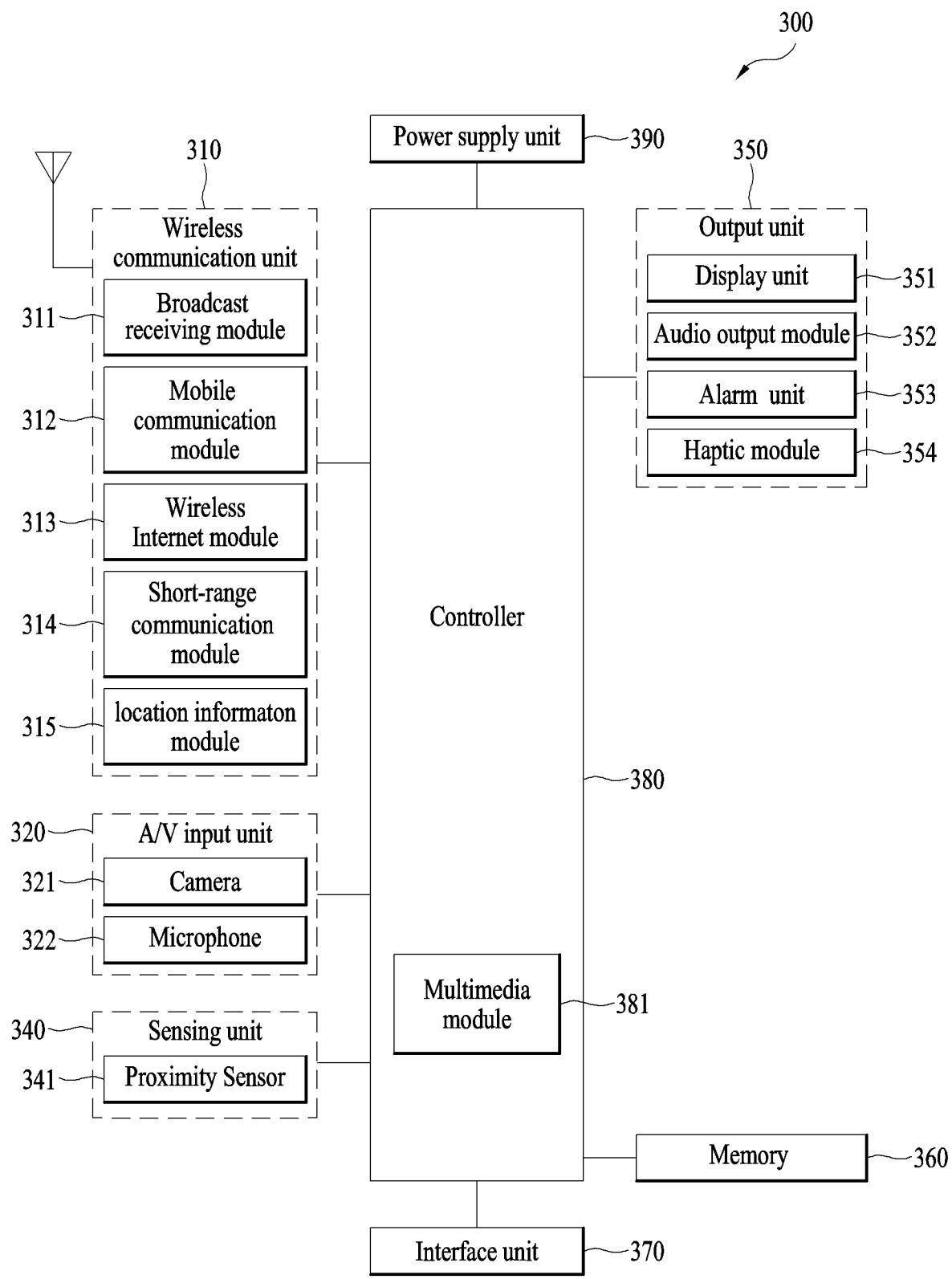
FIG. 3 is a schematic block diagram illustrating a digital device according to another embodiment of the present invention.

FIG. 2 is a schematic diagram of a digital device 200 according to an embodiment of the present invention. The digital device 200 can correspond to the client 100 shown in FIG. 1.

The digital device 200 can include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 can receive or transmit IP packets including service data through a network. In other words, the network interface 201 can receive IP packets including at least one of text data, image data, audio data, and video data, used for SNS, as well as services and applications from a server connected thereto through a network.

The TCP/IP manager 202 can involve delivery of IP packets transmitted to the digital device 200 and IP packets transmitted from the digital device 200, that is, packet delivery between a source and a destination. The TCP/IP manager 202 can classify received packets according to an appropriate protocol and output the classified packets to the service delivery manager 205, the service discovery manager 210, the service control manager 209, and the metadata manager 212.

The service delivery manager 203 can control classification and processing of service data. The service delivery manager 203 can control real-time streaming data, for example, using real-time protocol/real-time control protocol (RTP/RTCP). In other words, the service delivery manager 203 can parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 can demultiplex audio data, video data, SI from a received packet through packet identifier (PID) filtering and transmit the demultiplexed data to corresponding processors, that is, the audio/video decoder 206/207 and the SI decoder 204.

The SI decoder 204 can parse and/or decode SI data such as program specific information (PSI), program and system information protocol (PSIP), digital video broadcast-service information (DVB-SI), etc. The SI decoder 204 can store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively can decode audio data and video data, which are demultiplexed by the demultiplexer 205. The decoded audio data and video data can be provided to the user through the display unit 208.

The application manager can include a service manager 213 and a user interface (UI) manager 214, administrate the overall state of the digital device 200, provides a UI, and manage other mangers.

The UI manager 214 can receive a key input from the user and provide a graphical user interface (GUI) related to a receiver operation corresponding to the key input through OSD. For example, the UI manager 214 transmits the key input signal to the service manager 213 when receiving a key input relating to channel selection from the user.

The service manager 213 can control and manage service-related managers such as the service delivery manager 203, the service discovery manager 210, the service control manager 209, and the metadata manager 212.

The service manager 213 can configure a channel map and enable channel control at the request of the user on the basis of the channel map. The service manager 213 can receive service information corresponding to channel from the SI decoder 204 and set audio/video PID of a selected channel to the demultiplexer 205 so as to control the demultiplexing procedure of the demultiplexer 205.

The service discovery manager 210 can provide information required to select a service provider that provides a service. Upon receipt of a signal for selecting a channel from the service manager 213, the service discovery manager 210 discovers a service on the basis of the received signal.

The service control manager 209 can select and control a service. For example, the service control manager 209 can perform service selection and control using IGMP (Internet Group Management Protocol) or real time streaming protocol (RTSP) when the user selects a live broadcast service and using RTSP when the user selects a video on demand (VOD) service. The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 can manage metadata regarding services and store metadata in the SI & metadata DB 211.

The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data.

The SI & metadata DB 211 can be implemented using a Non-Volatile RAM (NVRAM) or a Flash memory, and the like.

An IMS (IP Multimedia Subsystem) gateway 250 can include functions required to access an IMS based IPTV services.

FIG. 3 is a block diagram of a digital device in accordance with an embodiment of the present invention. FIG. 3 illustrates a mobile terminal as another embodiment of the digital device while FIG. 2 described above illustrates a standing device as one embodiment of the digital device. With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components can be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel can include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal can be implemented as a TV broadcast signal, a radio broadcast signal, and/or a data broadcast signal, among other signals. If desired, the broadcast signal can further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various form. For instance, broadcast associated information can include an electronic program guide (EPG) of digital multimedia broadcasting (DMB) and an electronic service guide (ESG) of digital video broadcast-handheld (DVB-H).

The broadcast receiving module 311 can be configured to receive broadcast signals transmitted from various types of broadcast systems. By non-limiting example, such broadcasting systems can include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 can be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals can carry audio, video, and data according to text/multimedia messages.

The wireless Internet module 313 supports Internet access for the mobile terminal 300. This module can be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 can be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module can be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 can detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 can sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 can additionally or alternatively display images which are associated with these modes, the UI or the GUI.

The display module 351 can be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 can include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen can be named 'proximity touch' and an action of enabling the pointer to actually come into contact with the touch screen can named 'contact touch'. And, a position, at which the proximity touch is made to the touch screen using the pointer, can mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 can be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 can generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 can be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 can be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 can be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 can include a multimedia module 381 that provides multimedia playback. The multimedia module 381 can be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power can be internal power, external power, or combinations of internal and external power.

Various embodiments described herein can be implemented in a computer-readable medium using, for example, computer software, hardware, or some combination of computer software and hardware. For a hardware implementation, the embodiments described herein can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments can also be implemented by the controller 180.

For a software implementation, the embodiments described herein can be implemented with separate software modules, such as procedures and functions, each of which performs one or more of the functions and operations described herein. The software codes can be implemented with a software application written in any suitable programming language and can be stored in memory such as the memory 160, and executed by a controller or processor, such as the controller 380.

Figure 4:
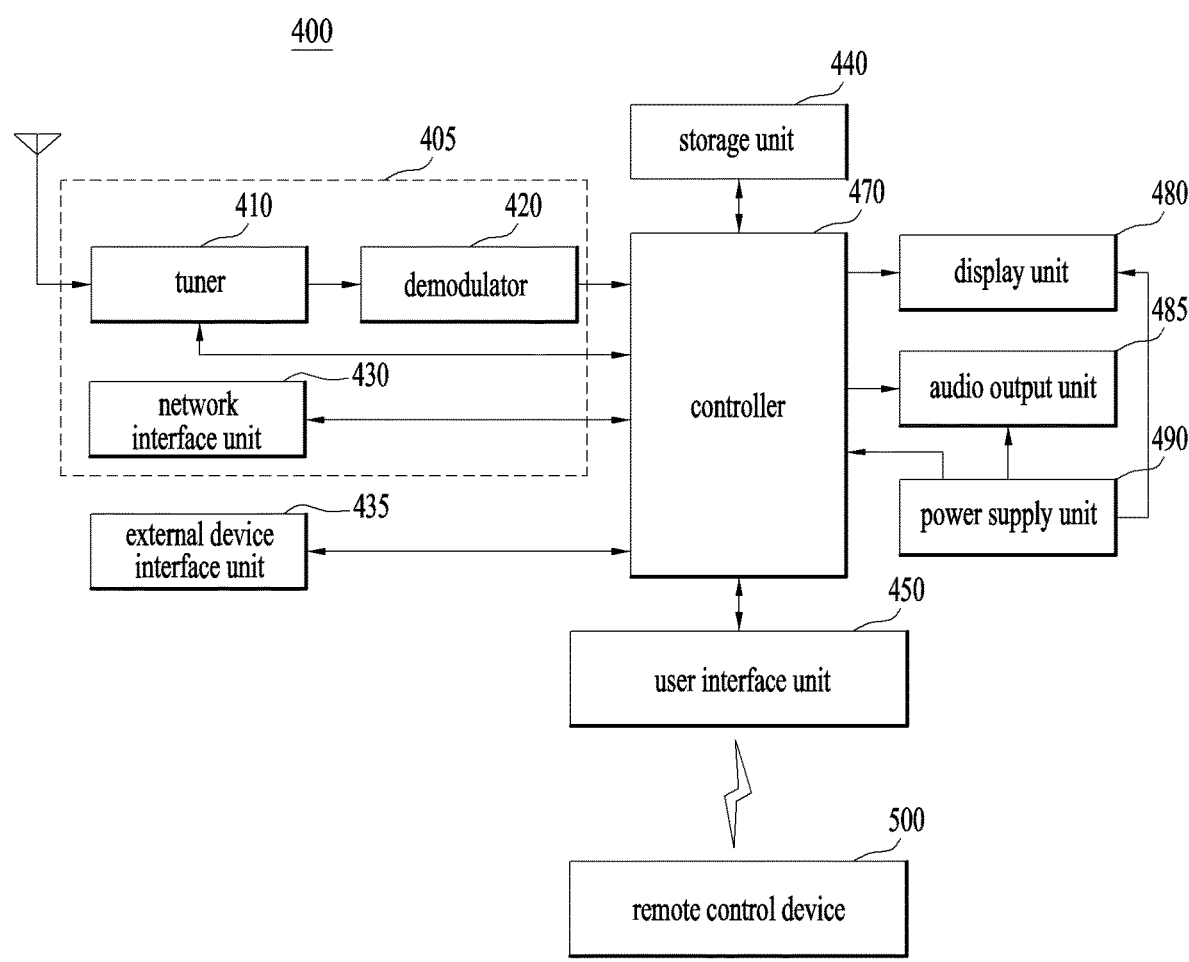
FIG. 4 is a schematic block diagram illustrating a digital device according to other embodiment of the present invention.

FIG. 4 illustrates a digital device according to another embodiment of the present invention.

Referring to FIG. 4, an exemplary digital device 400 according to the present invention can include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 can include at least one of one or more tuner 410, a demodulator 420, and a network interface 430.

The broadcast receiving unit 405 can include the tuner 410 and the demodulator 420 without the network interface 430, or can include the network interface 430 without the tuner 410 and the demodulator 420. The broadcast receiving unit 405 can include a multiplexer (not shown) to multiplex a signal, which is subjected to the tuner 410 and demodulated by the demodulator 420, and a signal received through the network interface 40.

In addition, the broadcast receiving unit 405 can include a demultiplexer (not shown) and demultiplex a multiplexed signal, a demodulated signal, or a signal received through the network interface 430.

The tuner 410 can receive a radio frequency (RF) broadcast signal by tuning to a channel selected by the user from among RF broadcast signals received through an antenna or all previously stored channels.

The demodulator 420 can receive a digital IF (Intermediate Frequency) signal (DIF) converted by the tuner 410 and demodulate the DIF signal.

A stream signal output from the demodulator 420 can be input to the controller 470.

The controller 470 can control demultiplexing, audio/video signal processing, etc. Furthermore, the controller 470 can control output of an image through the display unit 480 and output of audio through the audio output unit 485.

The external device interface 435 can provide an environment for interfacing external devices with the digital device 400. To implement this, the external device interface 435 can include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit can include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital device 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 can provide an interface for connecting the digital device 400 to wired/wireless networks.

Using the network interface 430, the digital device can transmit/receive data to/from other users or other electronic apparatuses or access a predetermined web page through a network connected thereto or another network linked to the connected network.

The network interface 430 can selectively receive a desired application from among publicly open applications through a network.

The storage unit 440 can store programs for signal processing and control and store a processed video, audio or data signal.

In addition, the storage unit 440 can execute a function of temporarily storing a video, audio or data signal input from the external device interface 435 or the network interface 430.

The storage unit 440 can store information about a predetermined broadcast channel through a channel memory function.

The storage unit 440 can store an application or a list of applications input from the external device interface 435 or the network interface 430.

The storage unit 440 can store various platforms which will be described later.

The storage unit 440 can include storage media of one or more types, such as a flash memory type, a hard disk type, a multimedia card micro type, a card type memory (e.g. SD or XD memory), RAM, EEPROM, etc.

The digital device 400 can reproduce content files (a video file, a still image file, a music file, a text file, an application file, etc.) and provide them to the user.

While FIG. 4 illustrates an embodiment in which the storage unit 440 is separated from the controller 470, the configuration of the digital device 400 is not limited thereto and the storage unit 440 can be included in the controller 470.

The user input interface 450 can transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown).

Here, the sensing unit (not shown) can include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 can include a demultiplexer and an image processor, which are not shown in FIG. 4.

The controller 470 can control the overall operation of the digital device 300. For example, the controller 470 can control the tuner 410 to tune to an RF broadcast corresponding to a channel selected by the user or a previously stored channel.

The controller 470 can control the digital device 400 according to a user command input through the user input interface 450 or an internal program. Particularly, the controller 470 can control the digital device 400 to be linked to a network to download an application or application list that the user desires to the digital device 400.

For example, the controller 470 can control the tuner 410 to receive a signal of a channel selected in response to a predetermined channel selection command received through the user input interface 450. In addition, the controller 470 can process a video, audio or data signal corresponding to the selected channel. The controller 470 can control information on a channel selected by the user to be output with a processed video or audio signal through the display unit 480 or the audio output unit 485.

Alternatively, the controller 470 can control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content can be content stored in the digital device 400, received broadcast content, or content input from an external device. The content can include at least one of a broadcast image, an external input image, an audio file, a still image, an image of a linked web, and a text file.

The controller 470 can control display of applications or an application list, downloadable from the digital device 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital device 400 can further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 can convert a video signal, a data signal, and an OSD signal processed by the controller 470 and a video signal and a data signal received from the external device interface 435 into RGB signals to generate driving signals.

The display unit 480 can be a PDP, an LCD, an OLED, a flexible display, a 3D display or the like.

The display unit 480 can be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital device 400 can further include the sensing unit (not shown) for sensing a gesture of the user, which includes at least one of a touch sensor, a voice sensor, a position sensor, and an action sensor, as described above.

A signal sensed by the sensing unit (not shown) can be delivered to the controller 470 through the user input interface 450.

The digital device 400 can further include the photographing unit (not shown) for photographing the user. Image information acquired by the photographing unit (not shown) can be supplied to the controller 470.

The controller 470 can sense a gesture of the user from an image captured by the photographing unit (not shown) or a signal sensed by the sensing unit (not shown), or by combining the image and the signal.

The power supply unit 490 can supply power to the digital device 400.

Particularly, the power supply unit 490 can supply power to the controller 470 which can be implemented as a system-on-chip (SoC), the display unit 480 for displaying images, and the audio output unit 485 for audio output.

The remote controller 500 can transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital devices shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 can be omitted or a component (not shown in FIG. 2) can be added as required. The digital device according to the present invention can not include the tuner and the demodulator, differently from the digital devices shown in FIGS. 2 and 4, and can receive content through the network interface or the external device interface and reproduce the content.

Figure 5:
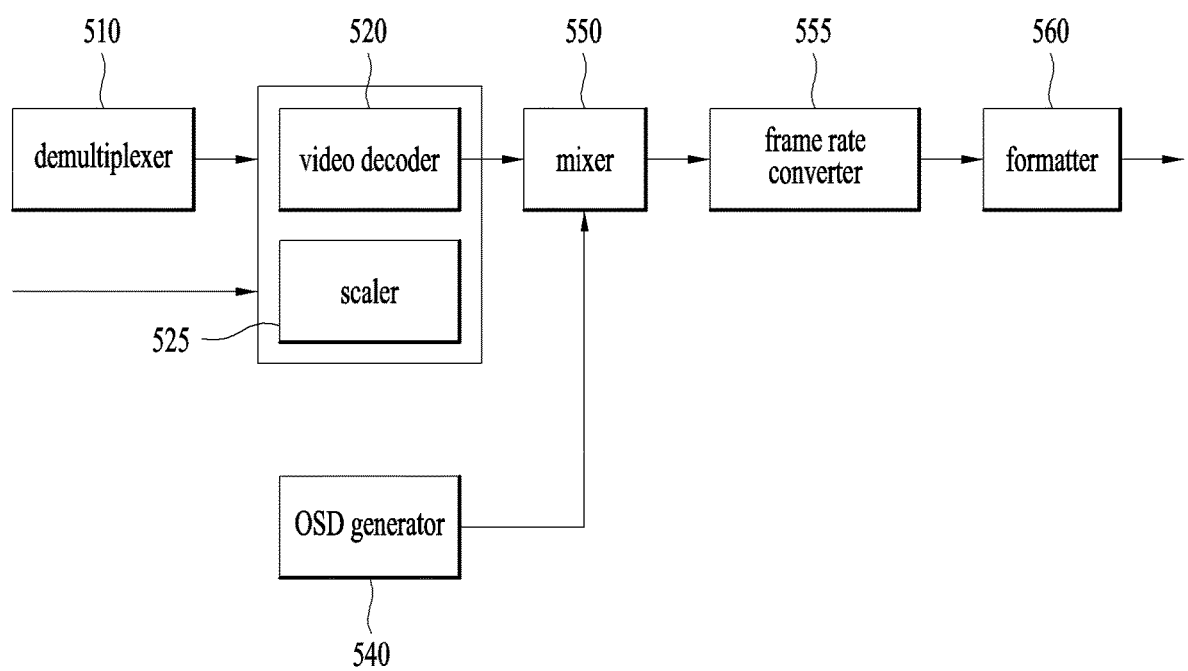
FIG. 5 is a schematic block diagram illustrating a detailed configuration of a controller of FIGS. 2 to 4 in accordance with one embodiment of the present invention.

FIG. 5 illustrates a digital device according to another embodiment of the present invention. Particularly, FIG. 5 shows a configuration for implementing a 3D digital device, which can be included in the configurations of FIGS. 2 through 4.

The digital device according to the present invention can include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor 520 can process a demultiplexed image signal using a video decoder 525 and a scaler 535.

The video decoder 525 can decode the demultiplexed image signal and the scaler 535 can scale the resolution of the decoded image signal such that the image signal can be displayed.

The image signal decoded by the image processor 520 can be input to the mixer 550.

The OSD generator 540 can generate OSD data automatically or according to user input. For example, the OSD generator 540 can generate data to be displayed on the screen of an output unit in the form of an image or text on the basis of a control signal of a user input interface.

OSD data generated by the OSD generator 540 can include various data such as a user interface image of the digital device, various menu screens, widget, icons, and information on ratings. The OSD generator 540 can generate a caption of a broadcast image or data for displaying EPG based broadcast information.

The mixer 550 can mix the OSD data generated by the OSD generator 540 and the image signal processed by the image processor 520. The mixer 550 can provide the mixed signal to the 3D formatter 560. By mixing the decoded image signal and the OSD data, OSD can be overlaid on a broadcast image or external input image.

The frame rate converter (FRC) 555 can convert a frame rate of input video. For example, the frame rate converter 555 can convert the frame rate of an input 60 Hz video to a frame rate of 120 Hz or 240 Hz, according to an output frequency of the output unit. The frame rate converter 555 can be bypassed when frame conversion is not executed.

The 3D formatter 560 can change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) can audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal can be EPG information including broadcast information such as the start time and end time (or duration) of a broadcast program which is broadcast through each channel.

The digital devices shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital device is an example of image signal processors which process an image stored therein or an input image. Other examples of the image signal processors can include a set-top box (STB) which does not include the display unit 380 and the audio output unit 485 shown in FIG. 4, a DVD player, a Blu-ray player, a game device, a computer, etc.

Figure 6:
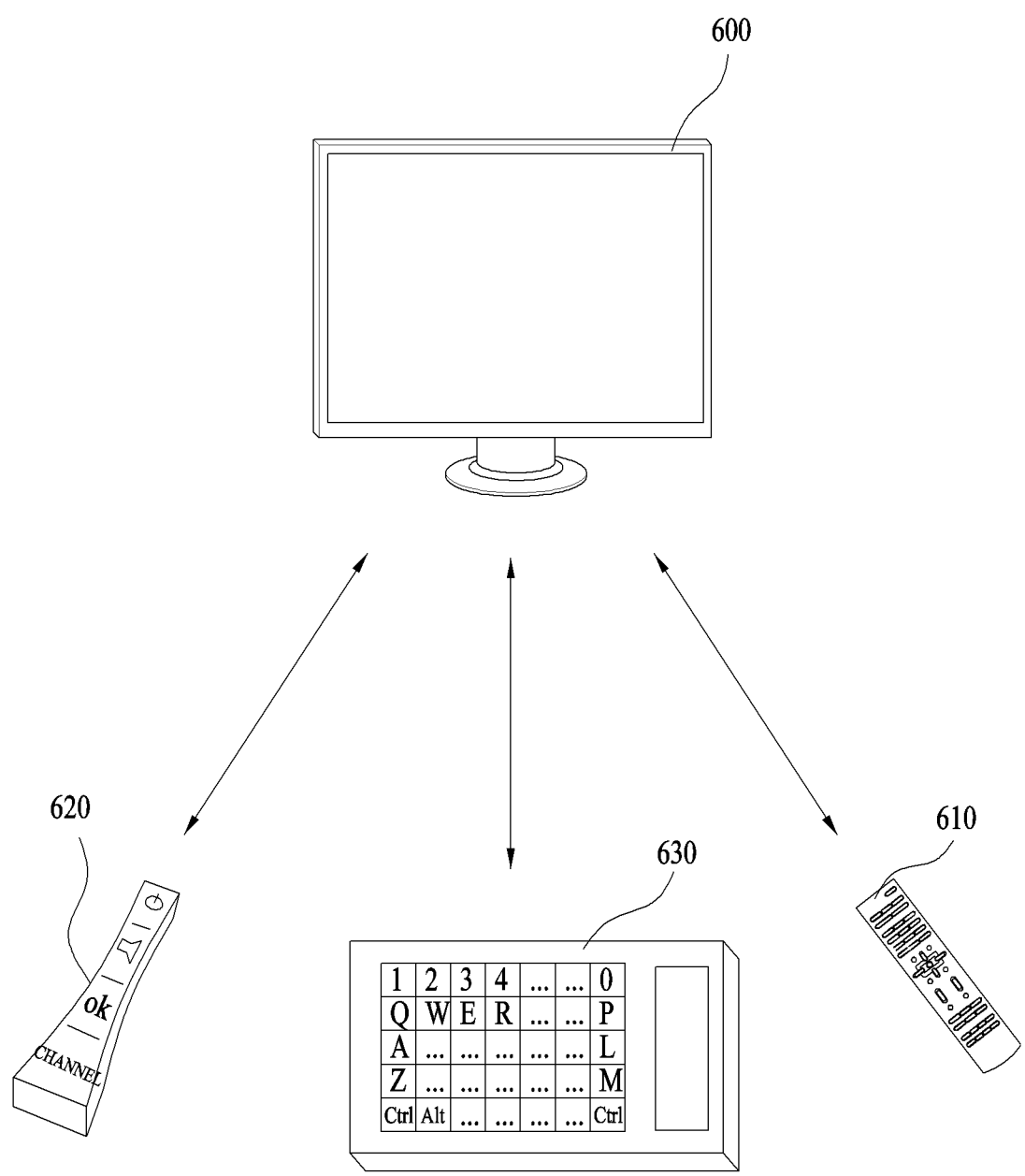
FIG. 6 is a view illustrating an input means connected with a digital device of FIGS. 2 to 4 according to one embodiment of the present invention.

FIG. 6 illustrates remote controllers of a digital device according to an embodiment of the present invention.

To execute various operations for implementing the present invention according to embodiments, various user interface devices (UIDs) which can communicate with a digital device 600 in a wired/wireless manner can be used as remote controllers.

UIDs can include a mobile device (e.g., a smart phone, a tablet PC, and the like), a magic remote controller 620 and a remote controller 630 equipped with a keyboard and a touch pad in addition to a general remote controller 610.

The remote controllers can use various communication protocols such as Bluetooth, RFID, IrDA, UWB, ZigBee, DLNA, etc.

The magic remote controller 620 can include a gyro sensor mounted therein to sense vibration of a user's hand or rotation.

That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

The digital device described in the present specification uses Web OS as a platform. Hereinafter, a Web OS based process or algorithm can be performed by the controller of the above-described digital device.

The controller includes the controllers of FIGS. 2 to 5 and has wide concepts. Accordingly, hereinafter, a component for processing Web OS based services, applications, content, etc., including software, firmware or hardware in a digital device is referred to a controller.

Such a Web OS based platform can improve development independency and functional extensibility by integrating services, applications, etc. based on a Luna-service bus, for example, and increase application development productivity based on web application framework. In addition, system resources, etc. can be efficiently used via a Web OS process and resource management to support multitasking.

A Web OS platform described in the present specification can be available not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

For convenience of description according to the present invention, it is assumed that the mobile terminal is, but not limited to, the digital device described with reference to FIG. 3, and it is assumed that an external display device communicatively connected with the mobile terminal is, but not limited to, the digital device described with reference to at least one of FIGS. 2 and 4. It is also assumed that an external mobile terminal communicatively connected with the mobile terminal is, but not limited to, the digital device described with reference to FIG. 3.

Hereinafter, examples of a method for performing a viewing reservation of a specific program through a group viewing reservation in a mobile terminal according to one embodiment of the present invention will be described with reference to FIGS. 7 to 17. In this case, the group viewing reservation means that a user performs a viewing reservation of a specific program using a mobile terminal and shares the viewing reservation with at least one external mobile terminal, and may share the viewing reservation of the specific program to register the viewing reservation in the display device communicatively connected with the at least one external mobile terminal.

Figure 7:
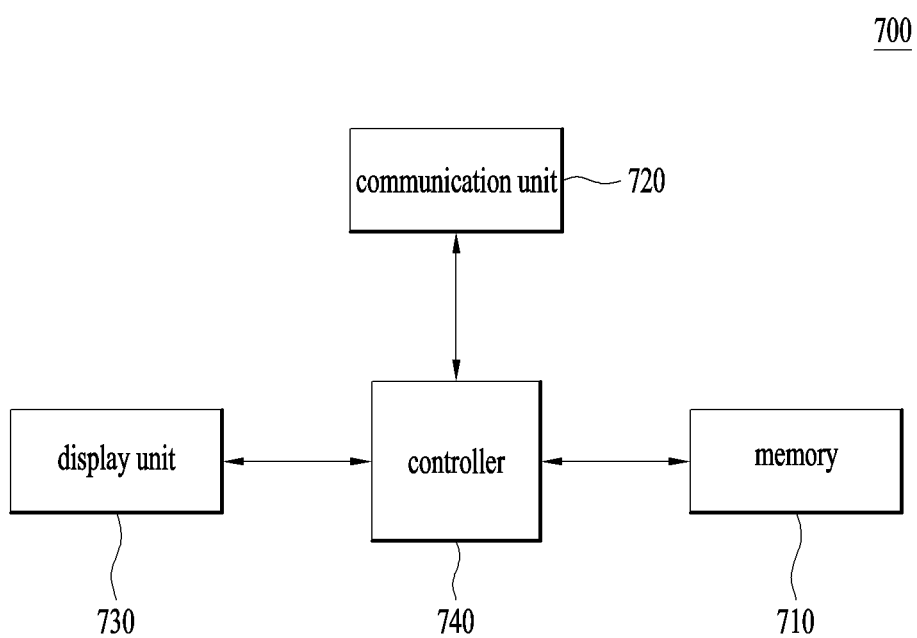
FIG. 7 is a view illustrating component modules of a mobile terminal according to one embodiment of the present invention.

FIG. 7 is a view illustrating component modules of a mobile terminal according to one embodiment of the present invention.

The mobile terminal 700 according to one embodiment of the present invention may include a memory 710, a communication unit 720, a display unit 730 and a controller 740. The component modules shown in FIG. 7 and the other component modules which are not shown in FIG. 7 may be understood with reference to FIGS. 1 to 6.

The memory 710 may store various programs, applications and algorithms, which are required for an operation of the mobile terminal 700. According to this embodiment, the memory 710 may previously store a specific application for controlling an external display device. In more detail, the specific application may be an application for controlling the digital device described with reference to FIGS. 2 to 4. For example, the specific application may be an application for performing a function of a remote controller of a TV. The memory 710 may store identification information (for example, contact address, name recorded in contact address, etc.) corresponding to at least one external mobile terminal. The memory 710 may be implemented as the memory 360 of FIG. 3.

The communication unit 720 may connect communication with at least one of an external server, an external mobile terminal and an external display device. In more detail, the communication unit 720 may receive EPG (Electronic Program Guide) data from the external server or the external display device. The communication unit 720 may receive a grant signal of a group viewing reservation, EPG data, a grant acknowledgement signal of a group viewing reservation, viewing reservation information, etc. from the external mobile terminal. The communication unit 720 may transmit a signal for a viewing reservation of a specific program to the external display device. The communication unit 720 may transmit a grant signal of a group viewing reservation, EPG data, a grant acknowledgement signal of a group viewing reservation, viewing reservation information, etc. to the external mobile terminal. The communication unit 720 may be implemented as the wireless communication unit 310 of FIG. 3.

The display unit 730 may display an execution screen of the specific application. The display unit 730 may be implemented as the display unit 351 of FIG. 3.

The controller 740 controls the operation of the mobile terminal 700, and generally manages functions of the memory 710, the communication unit 720 and the display unit 730. The controller 740 may be implemented as the controller 380 of FIG. 3.

Figure 8:
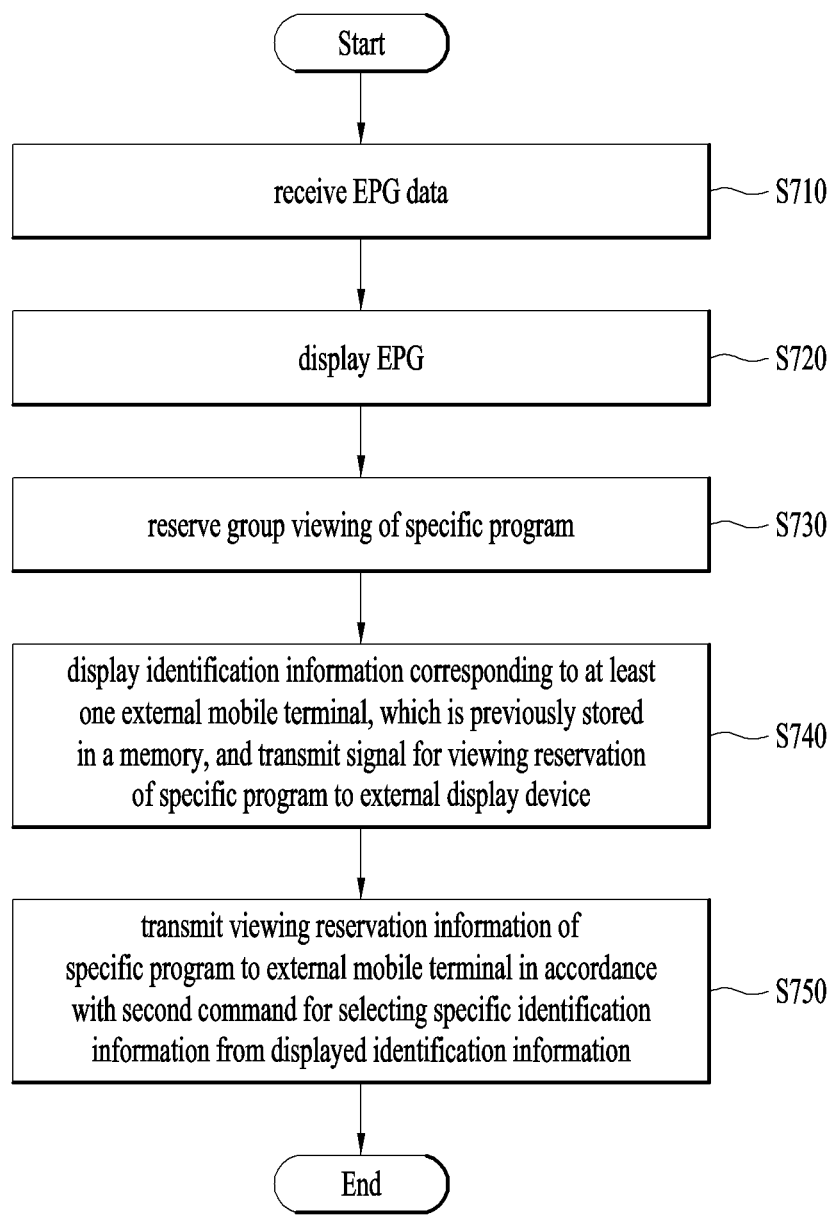
FIG. 8 is a flow chart illustrating an example of a method for performing a group viewing reservation for a specific program using a mobile terminal according to one embodiment of the present invention.

FIG. 8 is a flow chart illustrating an example of a method for performing a group viewing reservation for a specific program using a mobile terminal according to one embodiment of the present invention.

The controller 740 of the mobile terminal 700 may execute a preset application if a command to execute the preset application is sensed. The preset application may previously be stored in the memory 710. In this case, the preset application may be an application for controlling the external display device. For example, if the external display device is TV, an application for performing a function of a remote controller of the TV may be the preset application.

The preset application may be an application stored in the mobile terminal 700 from the time when the mobile terminal is released, or may be installed when an application program or firmware of the mobile terminal 700 is upgraded.

The controller 740 may control the communication unit 720 to receive EPG data (S710). In more detail, the controller 740 may receive the EPG data in accordance with a specific command. In this case, the EPG data may include channel information, information on broadcast time, information on broadcast program, information on broadcast program title, etc.

For example, the controller 740 may control the communication unit 720 to receive the EPG data from the external server. In this case, the external server may be a specific external server that generates and stores the EPG data, or may be a broadcast server that transmits the EPG data together with a broadcast signal.

For another example, the controller 740 may control the communication unit 720 to receive the EPG data from the external display device communicatively connected with the mobile terminal. In this case, the EPG data may be stored in the external display device.

For another example, the controller 740 may control the communication unit 720 to receive data required to generate EPG from the external server or the external display device.

The controller 740 may control the display unit 730 to display EPG on the basis of the received EPG data (S720). The EPG displays information similar to a list of television programs that may be viewed by local newspapers or other printing media and includes information required to compare and decode programs. Typically, the EPG provides information on each program within time frames covered by EPG having a range of next one hour to several days. The information included in the EPG includes programming features such as channel number, program title, starting time, ending time, elapsed time, remaining time, title and brief description of program contents. The EPG has time information on one axis, and is arranged on the other axis as a two-dimensional table having program source information such as channel information.

For example, the controller 740 may control the display unit 730 to display the EPG by using the EPG data received from the external server or the external display device.

For another example, the controller 740 may control the display unit 730 to generate EPG by using data required to generate the EPG received from the external server or the external display device and display the generated EPG.

The controller 740 of the mobile terminal 700 may perform a group viewing reservation for a specific program in accordance with a group viewing reservation command for the specific program (S730). The group viewing reservation means that a user performs a viewing reservation of a specific program using the mobile terminal and shares the viewing reservation with at least one external mobile terminal, and may share the viewing reservation of the specific program to register the viewing reservation in the display device communicatively connected with the at least one external mobile terminal. That is, if the user sets the group viewing reservation using the mobile terminal, the viewing reservation information on the specific program may be transmitted to the at least one external mobile terminal selected by the user and the viewing reservation of the specific program may be registered in the external display device communicatively connected with the at least one external mobile terminal.

The controller 740 may control the display unit 730 to display identification information corresponding to the at least one external mobile terminal previously stored in the memory 710, and may control the communication unit 720 to transmit a signal for a viewing reservation of the specific program to the external display device (S740).

In step S740, the identification information corresponding to the at least one external mobile terminal previously stored in the memory 710 may be contact address information stored in the memory 710. In more detail, the identification information may include a phone number of the external mobile terminal, a name of the external mobile terminal stored with respect to the external mobile terminal, image data stored with respect to the external mobile terminal, etc. For example, if contact addresses of a first person and a second person are stored in the memory 710, controller 740 may control the display unit 730 to display the contact address of the first person and the contact address of the second person, which are stored in the memory 710.

Meanwhile, the controller 740 may transmit the signal for the viewing reservation of the specific program to the external display device, which may be controlled through the specific application, or the external display device communicatively connected. In step S740, the external display device may register the viewing registration of the specific program as the signal is received. In this case, the viewing reservation may mean that a channel is automatically switched to a channel through which the specific program is broadcast at the time when the specific program starts, or may mean that the specific program is automatically executed at the time when the specific program starts.

The controller 740 may control the communication unit 720 to transmit the viewing reservation information on the specific program to the external mobile terminal corresponding to the specific identification information in accordance with a second command for selecting specific identification information of the displayed identification information (S750). For example, the controller 740 may control the communication unit 720 to transmit the viewing reservation information on the specific program to the external mobile terminal corresponding to the contact address of the first person in accordance with the second command for selecting the contact address of the first person from the contact addresses of the first and second persons.

According to this embodiment, it is advantageous that the viewing reservation of the specific program may be registered in the display device communicatively connected with the mobile terminal through the mobile terminal and also be registered in the display device communicatively connected with another mobile terminal.

Figure 9:
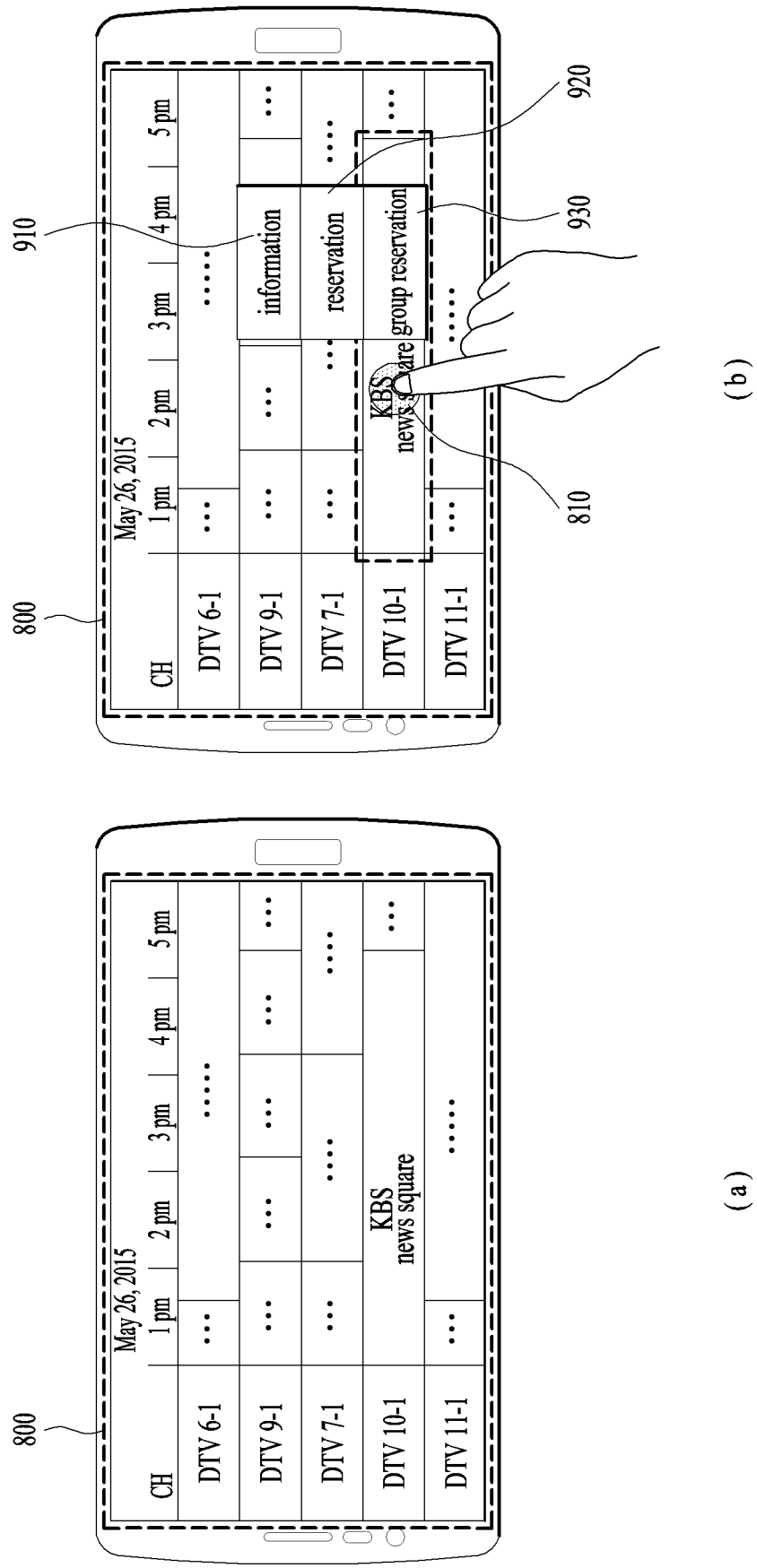
FIGS. 9 and 10 are views illustrating an example of a method for outputting EPG in a mobile terminal and a method for setting a group viewing reservation for a specific program through EPG according to one embodiment of the present invention.
Figure 10:
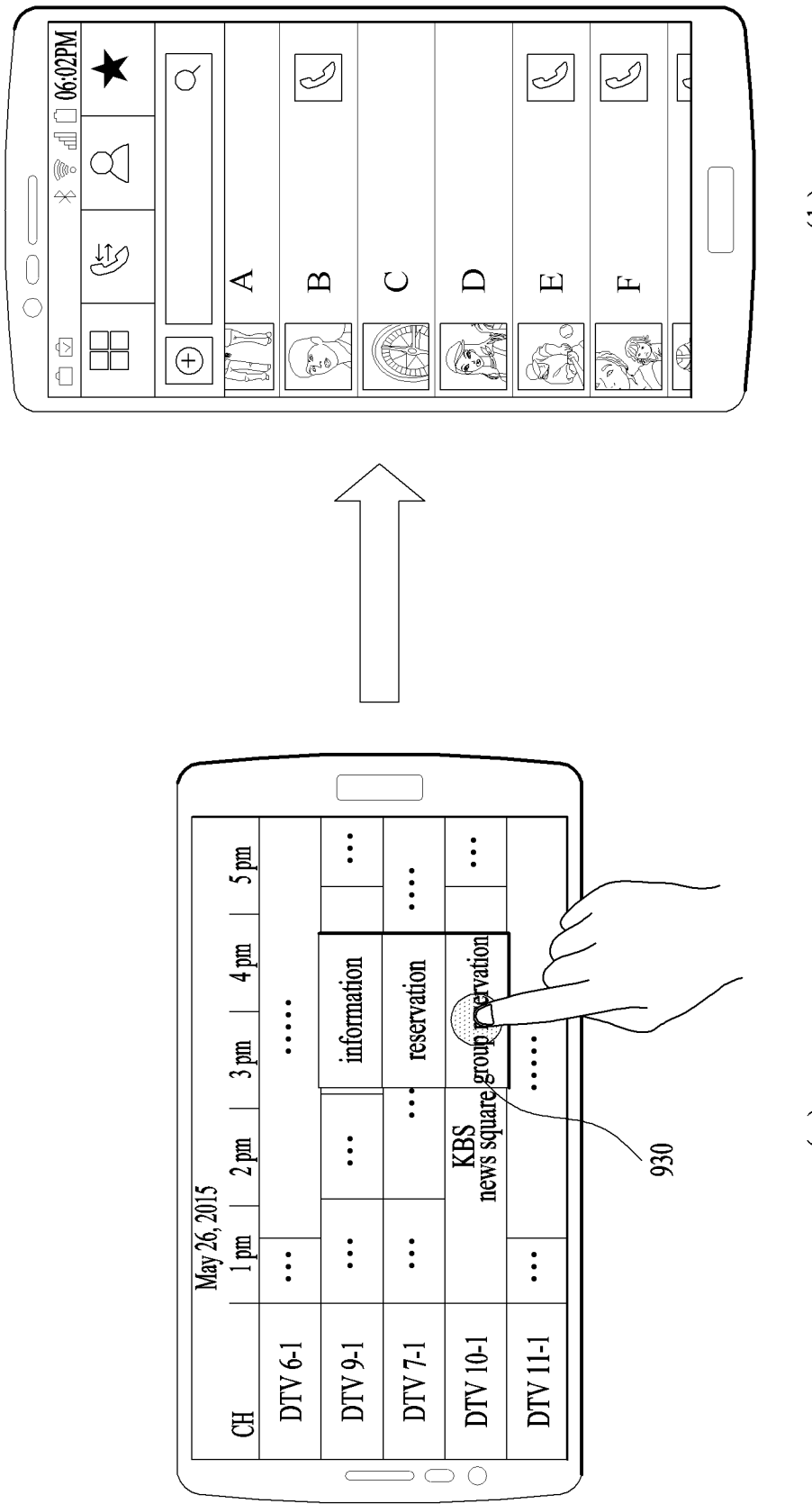

FIGS. 9 and 10 are views illustrating an example of a method for outputting EPG in a mobile terminal and a method for setting a group viewing reservation for a specific program through EPG according to one embodiment of the present invention. In respect of FIGS. 9 and 10, repeated description of the description made with reference to FIG. 8 will be omitted and the methods in FIGS. 9 and 10 will be described based on a difference from FIG. 8.

According to one embodiment of the present invention, the controller 740 may control the communication unit 720 to receive EPG data from the external server or the external display device.

Referring to FIG. 9(a), the controller 740 may control the display unit 730 to display EPG 800 by using the received EPG data. In this case, the EPG 800 displays information similar to a list of television programs that may be viewed by local newspapers or other printing media and includes information required to compare and decode programs. Typically, the EPG 800 provides information on each program within time frames covered by EPG 800 having a range of next one hour to several days. The information included in the EPG 800 includes programming features such as channel number, program title, starting time, ending time, elapsed time, remaining time, title and brief description of program contents. The EPG 800 has time information on one axis, and is arranged on the other axis as a two-dimensional table having program source information such as channel information. The program may be a program which has been broadcast or will be broadcast from the external display device communicatively connected with the mobile terminal 700.

Referring to FIG. 9(b), a user may set a group viewing reservation for a specific program by using the displayed EPG 800. In more detail, the controller 740 may control the display unit 730 to display at least one of a first indicator 910, a second indicator 920 and a third indicator 930 in accordance with a touch command for touching a title of a specific program among titles of at least one program displayed on the EPG 800.

The controller 740 may control the display unit 730 to display information on the specific program in accordance with a first command for selecting the first indicator 910. In this case, the information on the specific program may include information on a starting time of the specific program, information on an ending time of the specific program, a title of the specific program and brief description of contents of the specific program.

The controller 740 may control the communication unit 720 to transmit a reservation signal for reserving the specific program in accordance with a second command for selecting the second indicator 920.

For example, the controller 740 may control the communication unit 720 to transmit a reservation signal for a viewing reservation of the specific program to the external display device communicatively connected therewith, in accordance with the second command for selecting the second indicator 920.

For another example, the controller 740 may control the communication unit 720 to transmit the reservation signal for reservation recording of the specific program to the external display device communicatively connected therewith, in accordance with the second command for selecting the second indicator 920.

For other example, if a plurality of external display devices communicatively connected with the mobile terminal 700 are provided, the controller 740 may display a screen for selecting the external display device, which will transmit the reservation signal (or the reservation signal for reservation recording) for reserving the specific program, from the plurality of display devices in accordance with the second command for selecting the second indicator 920. The controller 740 may control the communication unit 720 to transmit the reservation signal (or the reservation signal for reservation recording) for reserving the specific program to the selected external display device through the displayed screen.

The controller 740 may set a group viewing reservation in accordance with a command for selecting the third indicator 930.

In more detail, referring to FIG. 10(a), the controller 740 may set the group viewing reservation for the specific program in accordance with a touch input for the third indicator 930. In this case, the controller 740 may control the communication unit 720 to transmit the signal for a viewing reservation of the specific program to the external display device communicatively connected therewith.

Referring to FIG. 10(b), the controller 740 may control the display unit 730 to display at least one identification information previously stored in the memory 710 in accordance with the touch input for the third indicator 930 in FIG. 10(a). In this case, the identification information may include a phone number of the external mobile terminal, a name of the external mobile terminal stored with respect to the external mobile terminal, image data stored with respect to the external mobile terminal, etc.

The controller 740 may control the communication unit 720 to transmit EPG data and an acknowledgement signal as to grant of the group viewing reservation to at least one external mobile terminal corresponding to the selected identification information in accordance with a command for selecting any one kind of identification information (or a plurality of kinds of identification information) among the displayed identification information.

Meanwhile, in accordance with the embodiment, the controller 740 may add identification information of the external mobile terminal having a history of the group viewing reservation to a bookmark. The controller 740 may control the display unit 730 to first display the identification information of the external mobile terminal having the history of the group viewing reservation prior to identification information of another external mobile terminal.

According to this embodiment, it is advantageous that the user may select at least one external mobile terminal which will share the viewing reservation of the specific program to allow the viewing reservation to be easily made by the external display device communicatively connected with another mobile terminal.

Meanwhile, according to one embodiment of the present invention, the controller 740 may be selected an external display device which will register a viewing reservation if a plurality of external display devices communicatively connected with the mobile terminal 700 are provided. This will be described in more detail with reference to FIG. 11.

Figure 11:
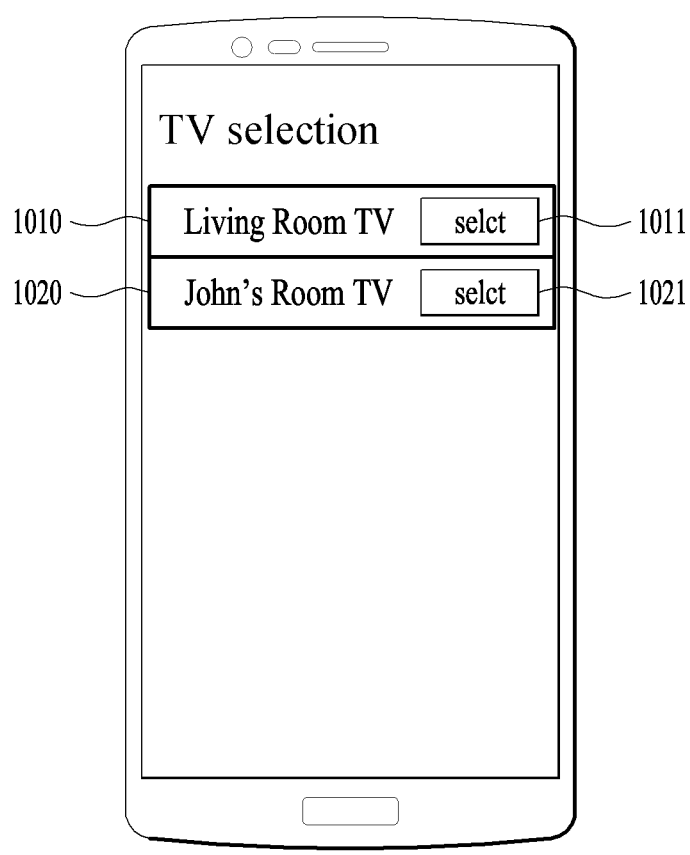
FIG. 11 is a view illustrating an example of a method for selecting an external display device which will register a viewing reservation in a mobile terminal according to one embodiment of the present invention.

FIG. 11 is a view illustrating an example of a method for selecting an external display device which will register a viewing reservation in a mobile terminal according to one embodiment of the present invention. In respect of FIG. 11, repeated description of the description made with reference to FIGS. 8 to 10 will be omitted and the method in FIG. 11 will be described based on a difference from FIGS. 8 to 10.

According to one embodiment of the present invention, the controller 740 may control the communication unit 720 to receive EPG data from the external server or the external display device communicatively connected therewith. The controller 740 may control the display unit 730 to display EPG on the basis of the received EPG data. The controller 740 may control the communication unit 720 to transmit a reservation signal for a viewing reservation of a specific program among at least one program included in the EPG in accordance with a command to reserve group viewing for the specific program.

Meanwhile, referring to FIG. 11, if a plurality of external display devices communicatively connected with the mobile terminal are provided, the controller 740 may control the display unit 730 to display information 1010 and 1020 on the plurality of external display devices. In this case, the information 1010 and 1020 on the plurality of external display devices may include a name set with respect to the external display device, and may include a name set based on a place where the external display device is provided. The information 1010 and 1020 on the plurality of external display devices may include specific indicators 1011 and 1021.

In accordance with a command for selecting the first one 1011 of the specific indicators 1011 and 1021, the controller 740 may recognize that the external display device corresponding to the first indicator has been selected. Also, in accordance with a command for selecting the second one 1021 of the specific indicators 1011 and 1021, the controller 740 may recognize that the external display device corresponding to the second indicator has been selected. As a result, the controller may transmit a signal for a viewing reservation of the specific program to the selected external display device.

For example, it is assumed that the external display devices communicatively connected with the mobile terminal 700 are the first display device (for example, TV of living room) and the second display device (for example, TV of John's room). In this case, the controller 740 may control the display unit 730 to display the information 1010 on the first display device and the information 1020 on the second display device. The controller 740 may control the communication unit 720 to transmit the signal for a viewing reservation of the specific program to the first display device in accordance with the command for selecting the first indicator 1011 included in the information 1010 on the first display device.

For another example, it is assumed that the external display devices communicatively connected with the mobile terminal 700 are the first display device (for example, TV of living room) and the second display device (for example, TV of John's room). In this case, the controller 740 may control the display unit 730 to display the information 1010 on the first display device and the information 1020 on the second display device. The controller 740 may control the communication unit 720 to transmit the signal for a viewing reservation of the specific program to the second display device in accordance with the command for selecting the second indicator 1021 included in the information 1020 on the second display device.

The controller 740 may control the communication unit 720 to transmit the signal for a viewing reservation of the specific program to another external display device in addition to the external display device communicatively connected with the mobile terminal.

In more detail, the memory 710 may store information on the external display device having a history of communication connected with the mobile terminal 100. The controller 740 may control the display unit 730 to display information of the external display device having the history of communication as well as information on the external display device currently connected with the mobile terminal. Also, in accordance with a command for selecting the information on the external display device having the history of communication with the mobile terminal 100, the controller 740 may control the communication unit 720 to transmit the signal for a viewing reservation of the specific program to the external display device corresponding to the selected command.

For example, it is assumed that the external display device communicatively connected with the mobile terminal is the first display device and the external display device having the history of communication is the second display device. In this case, the controller 740 may sense the command for selecting the second indicator 1021 included in the information on the second display device in a state that the information 1020 on the second display device is displayed. The controller 740 may control the communication unit 720 to transmit the signal for a viewing reservation to the second display device in accordance with the sensed command. In more detail, since communication is not connected between the second display device and the mobile terminal 700, the controller 740 may control the communication unit 720 to transmit the signal for a viewing reservation to the external server and transmit the signal for a viewing reservation to the second display device through the external server.

Meanwhile, according to one embodiment of the present invention, the controller 740 may control the communication unit 720 to transmit viewing reservation information to the external mobile terminal when receiving a grant signal of a group viewing reservation from the external mobile terminal. This will be described in more detail with reference to FIG. 12.

Figure 12:
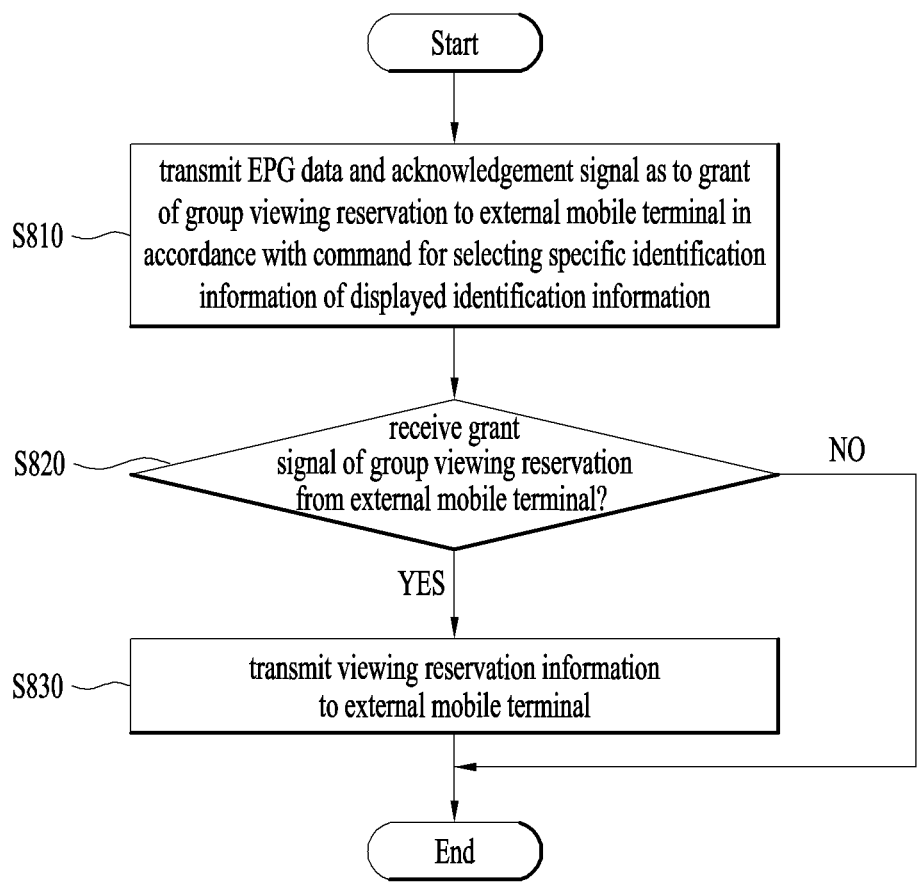
FIG. 12 is a flow chart illustrating an example of a method for transmitting viewing reservation information to an external display device in a mobile terminal according to one embodiment of the present invention.

FIG. 12 is a flow chart illustrating an example of a method for transmitting viewing reservation information to an external display device in a mobile terminal according to one embodiment of the present invention. In respect of FIG. 12, repeated description of the description made with reference to FIGS. 8 to 11 will be omitted and the method of FIG. 12 will be described based on a difference from FIGS. 8 to 11.

The controller 740 may control the communication unit 720 to transmit EPG data and an acknowledgement signal as to grant of the group viewing reservation to an external mobile terminal in accordance with a command for selecting specific one of at least one kind of identification information displayed in step S750 of FIG. 7 (S810). In this case, the external mobile terminal may be a mobile terminal corresponding to the specific identification information.

In step S810, the EPG data are transmitted to the external mobile terminal to identify whether EPG data stored in the external mobile terminal have been updated.

The controller 740 may control the communication unit 720 to receive a grant signal of a group viewing reservation or a reject signal of a group viewing reservation from the external mobile terminal (S820).

In more detail, a message for identifying whether the group viewing reservation has been granted may be displayed on the external mobile terminal, and a user of the external mobile terminal may input whether to grant the group viewing reservation through the message.

If the grant signal of the group viewing reservation is received (S820, Yes), the controller 740 may control the communication unit 720 to transmit viewing reservation information to the external mobile terminal (S830). In this case, the viewing reservation information may include information on a specific program to which a group viewing reservation is set, and information on a channel of the specific program to which the group viewing reservation is set. The external mobile terminal may allow the viewing reservation of the specific program to be performed in the display device communicatively connected with the external mobile terminal by using the viewing reservation information.

Meanwhile, if the reject signal of the group viewing reservation is received (S820, No), the controller 740 may control the display unit 730 to display a message indicating that the group viewing reservation has been rejected or may not perform any function.

Meanwhile, according to one embodiment of the present invention, if the acknowledgment signal as to grant of the group viewing reservation is received, the controller 740 may control the display unit 730 to display a message for identifying grant of the group viewing reservation. If the user grants the group viewing reservation, the controller 740 may transmit a signal for viewing reservation of a specific program corresponding to viewing reservation information to the external display device communicatively connected with the mobile terminal, and may store a broadcast schedule of the specific program in the memory 710. This will be described in more detail with reference to FIG. 13.

Figure 13:
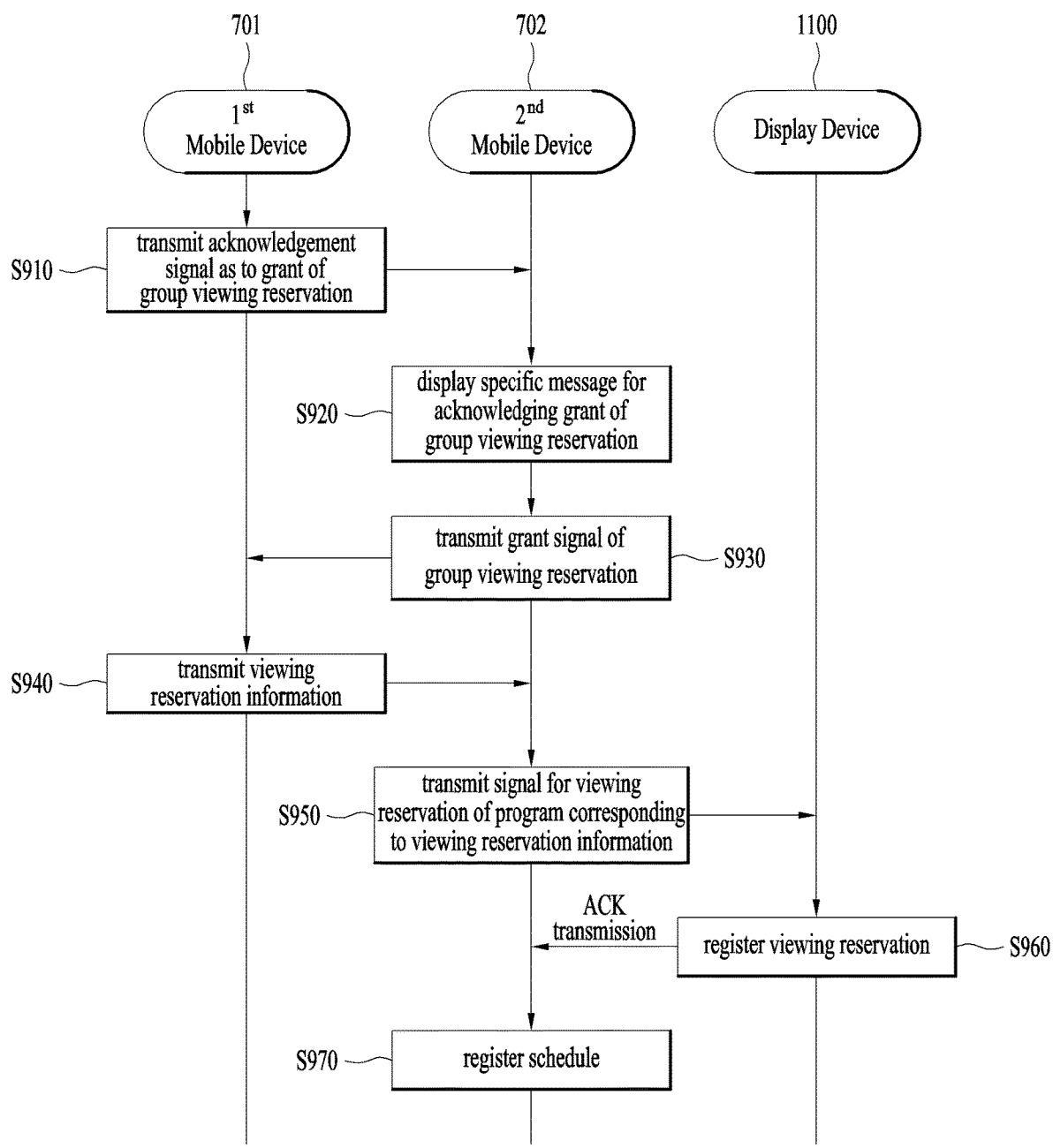
FIG. 13 is a view illustrating an example of a method for registering a viewing reservation in an external display device when a mobile terminal according to one embodiment of the present invention receives a signal related to a group viewing reservation from the external display device.

FIG. 13 is a view illustrating an example of a method for registering a viewing reservation in an external display device when a mobile terminal according to one embodiment of the present invention receives a signal related to a group viewing reservation from the external display device. In respect of FIG. 13, repeated description of the description made with reference to FIGS. 8 to 12 will be omitted and the method of FIG. 13 will be described based on a difference from FIGS. 8 to 12.

In this embodiment, for convenience of description, it is assumed that a main device is a second mobile terminal 702 and an external mobile terminal communicatively connected with the second mobile terminal 702 is a first mobile terminal 701. The first mobile terminal 701 and the second mobile terminal 702 may be digital devices described with reference to FIG. 3.

The controller 740 of the first mobile terminal 701 may control the communication unit 720 to transmit an acknowledgement signal as to grant of a group viewing reservation to the second mobile terminal 702 in accordance with a group viewing reservation command for a specific program (S910).

The controller 740 of the second mobile terminal 702 may control the display unit 730 to display a specific message for identifying grant of a group viewing reservation as the acknowledgement signal as to grant of the group viewing reservation is received (S920). In this case, the user of the second mobile terminal 702 may grant or reject the group viewing reservation by using the displayed message.

If a command to grant the group viewing reservation is sensed through the message, the controller 740 of the second mobile terminal 702 may control the communication unit 720 to transmit the grant signal of the group viewing reservation (S930).

Meanwhile, in accordance with the embodiment, the controller 740 of the second mobile terminal 702 may control the communication unit 720 to transmit a signal for displaying the identification information of the first mobile terminal 702 to the external display device 1100 of the first mobile terminal 701, which is communicatively connected with the second mobile terminal 702. The external display device 1100 may display the identification information of the first mobile terminal 701 when receiving the signal.

The first mobile terminal 701 my control the communication unit 720 to transmit viewing reservation information to the second mobile terminal 702 when receiving the grant signal of the group viewing reservation (S940).

The controller 740 of the second mobile terminal 702 may control the communication unit 720 to transmit a signal for a viewing reservation of a specific program corresponding to the viewing reservation information to the external display device 1100 communicatively connected with the second mobile terminal 702 when receiving the viewing reservation information from the first mobile terminal 701. That is, the controller 740 of the second mobile terminal 702 may control the communication unit 720 to transmit a signal for a viewing reservation of a specific program corresponding to the second viewing reservation information based on the viewing reservation information received from the first mobile terminal 701 to the external display device 1100 communicatively connected with the second mobile terminal 702.

The external display device 1100 may register the viewing registration for the specific program to correspond to the signal for a viewing reservation of the specific program received from the second mobile terminal (S960).

The external display device 1100 may transmit ACK to the second mobile terminal 702.

The controller 740 of the second mobile terminal 702 may register a schedule of the specific program when receiving the ACK from the external display device (S970). In detail, the controller 740 may store a schedule generated based on the viewing reservation information received from the first mobile terminal 701 in the memory 710. In more detail, the controller 740 may register a schedule indicating that the viewing reservation of the specific program has been registered from the time when the specific program starts to the time when the specific program ends.

Meanwhile, the controller 740 may control the display unit 730 to display a specific message when receiving the grant signal of the group viewing reservation according to the group viewing reservation from the external mobile terminal. This will be described in more detail with reference to FIG. 14.

Figure 14:
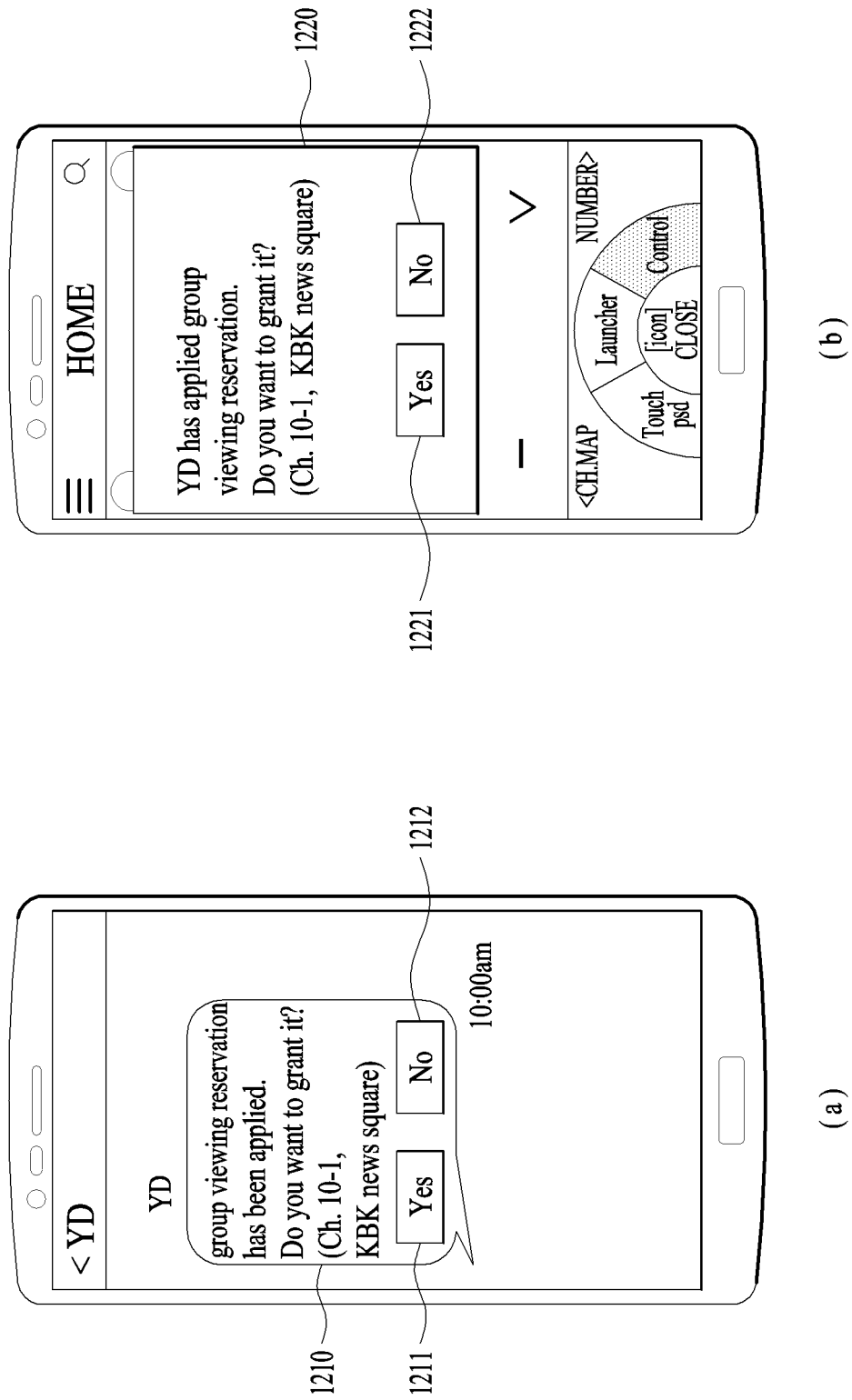
FIG. 14 is a view illustrating an example of a specific message displayed when a mobile terminal according to one embodiment of the present invention receives a grant signal of a group viewing reservation from the external display device.

FIG. 14 is a view illustrating an example of a specific message displayed when a mobile terminal according to one embodiment of the present invention receives a grant signal of a group viewing reservation from the external display device. In respect of FIG. 14, repeated description of the description made with reference to FIGS. 8 to 13 will be omitted and the example of FIG. 14 will be described based on a difference from FIGS. 8 to 13.

According to one embodiment of the present invention, the controller 740 may receive an acknowledgement signal as to grant of the group viewing reservation from the external mobile terminal communicatively connected with the mobile terminal according to one embodiment of the present invention. In this case, the acknowledgement signal as to grant of the group viewing reservation may include information on a channel to which the group viewing reservation is set, information on a program to which the group viewing reservation is set, etc.

Referring to FIG. 14(*a*), the controller 740 may display a specific message 1210, which includes a content for acknowledging grant of the group viewing reservation, in a social network service (SNS) interactive type on the basis of the acknowledgment signal as to grant of the group viewing reservation. The specific message 1210 may include at least one of information on the channel to which the group viewing reservation is set and information on the program to which the group viewing reservation is set.

Also, the specific message 1210 may include a first indicator 1211 corresponding to grant of the group viewing reservation and a second indicator 1212 corresponding to rejection of the group viewing reservation.

The controller 740 may control the communication unit 720 to transmit a signal for viewing reservation of the program, to which the group viewing reservation is set, to the external display device communicatively connected with the mobile terminal 700 in accordance with a command to select the first indicator 1211. The controller 740 may control the communication unit 720 to transmit the signal indicating that the group viewing reservation has been granted, to the external mobile terminal.

The controller 740 may control the communication unit 720 to transmit the signal indicating that the group viewing reservation has been rejected to the external mobile terminal in accordance with a command to select the second indicator 1212.

Meanwhile, referring to FIG. 14(*b*), the controller 740 may control the display unit 730 to display a specific message 1220, which identifies whether to grant the group viewing reservation on the basis of the acknowledgement signal as to grant of the group viewing reservation on an execution screen of a remote controller application. The specific message 1220 may include a first indicator 1221 corresponding to grant of the group viewing reservation and a second indicator 1222 corresponding to rejection of the group viewing reservation.

The controller 740 may control the communication unit 720 to transmit a signal for viewing reservation of the program, to which the group viewing reservation is set, to the external display device communicatively connected with the mobile terminal 700 in accordance with a command to select the first indicator 1221. The controller 740 may control the communication unit 720 to transmit the signal indicating that the group viewing reservation has been granted, to the external mobile terminal.

The controller 740 may control the communication unit 720 to transmit the signal indicating that the group viewing reservation has been rejected to the external mobile terminal in accordance with a command to select the second indicator 1222.

Meanwhile, according to one embodiment of the present invention, the controller 740 may control the display unit 730 to display a specific message even when receiving the grant signal or the reject signal of the group viewing reservation from the external mobile terminal. This will be described in more detail with reference to FIG. 15.

Figure 15:
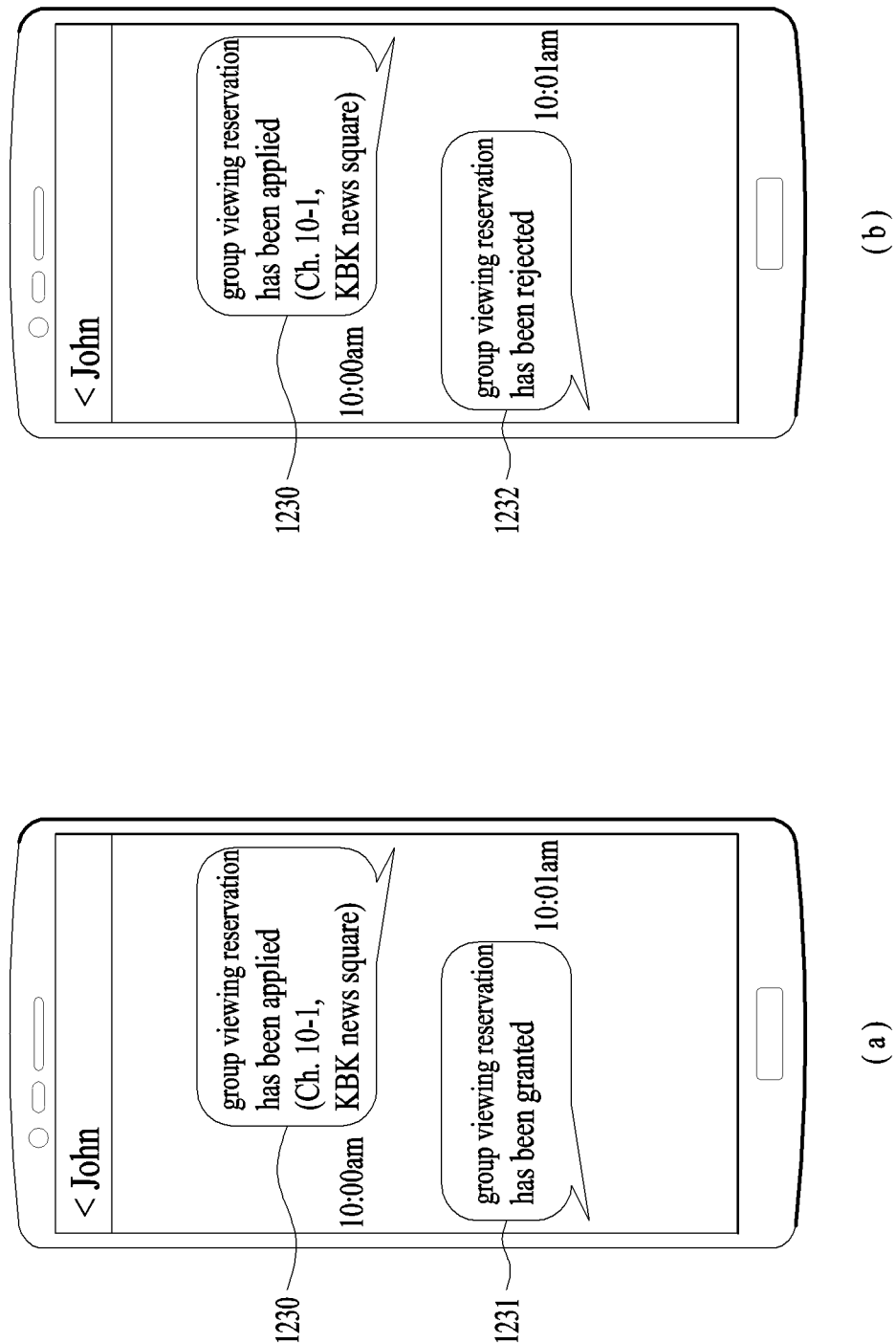
FIG. 15 is a view illustrating an example of a specific message displayed when a mobile terminal according to one embodiment of the present invention receives a grant signal of a group viewing reservation or a reject signal of a group viewing reservation.

FIG. 15 is a view illustrating an example of a specific message displayed when a mobile terminal according to one embodiment of the present invention receives a grant signal of a group viewing reservation or a reject signal of a group viewing reservation. In respect of FIG. 15, repeated description of the description made with reference to FIGS. 8 to 14 will be omitted and the example of FIG. 15 will be described based on a difference from FIGS. 8 to 14.

Referring to (a) and (b) of FIG. 15, the controller 740 may control the display unit to display a message 1230 indicating that a group viewing reservation of a specific program has been applied, in accordance with the group viewing reservation of the specific program. The message 1230 may include information on a channel to which the group viewing reservation is set, information on a program to which the group viewing reservation is set, etc. In respect of this embodiment, the message 1230 may be displayed in SNS interactive type or specific message type on a remote controller application.

Referring to FIG. 15(*a*), the controller 740 may control the display unit 730 to display a message 1231 indicating that the user of the external mobile terminal communicatively connected with the mobile terminal of this embodiment has granted the group viewing reservation if the grant signal of the group viewing reservation is received after transmitting the signal as to grant of the group viewing reservation to the external mobile terminal.

Referring to FIG. 15(*b*), the controller 740 may control the display unit 730 to display a message 1232 indicating that the user of the external mobile terminal communicatively connected with the mobile terminal of this embodiment has rejected the group viewing reservation if the reject signal of the group viewing reservation is received after transmitting the signal as to grant of the group viewing reservation to the external mobile terminal.

According to this embodiment, it is advantageous that the user of the mobile terminal 700 may identifier whether the external mobile terminal has granted the viewing reservation after setting the group viewing reservation.

Meanwhile, according to one embodiment of the present invention, the controller 740 may update EPG data if EPG data received from the external mobile terminal are different from those stored in the memory 710. This will be described in more detail with reference to FIG. 16.

Figure 16:
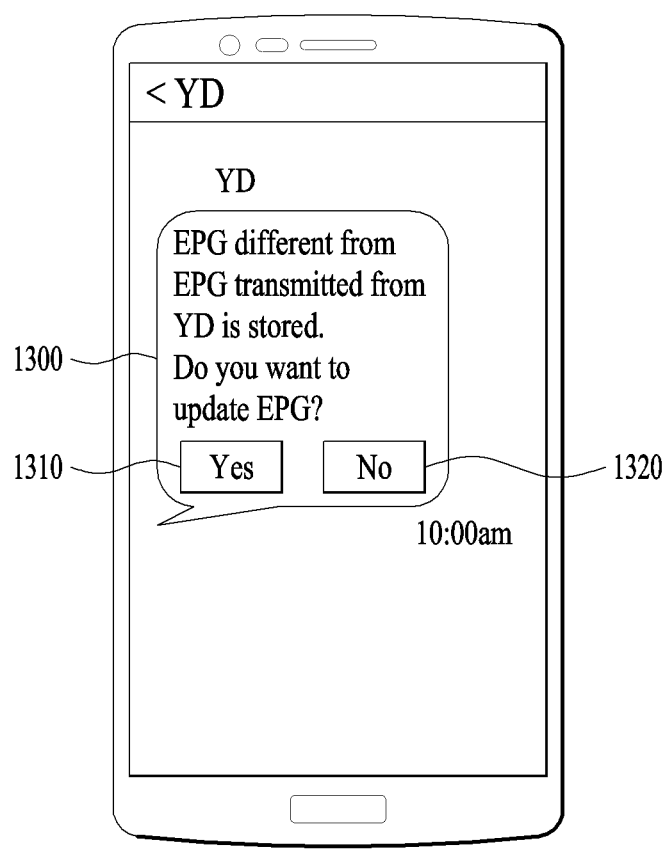
FIG. 16 is a view illustrating an example of a method for updating EPG data in a mobile terminal according to one embodiment of the present invention.

FIG. 16 is a view illustrating an example of a method for updating EPG data in a mobile terminal according to one embodiment of the present invention. In respect of FIG. 16, repeated description of the description made with reference to FIGS. 8 to 15 will be omitted and the example of FIG. 16 will be described based on a difference from FIGS. 8 to 15.

According to one embodiment of the present invention, first EPG data received from the external server or the external display device may previously be stored in the memory 710 of the mobile terminal 700.

The controller 740 may determine whether to update EPG data by comparing the first EPG data with second EPG data when the second EPG data and a signal as to grant of the group viewing reservation are received from the external mobile terminal.

In detail, referring to FIG. 16, the controller 740 may recognize whether the first EPG data are different from the second EPG data through comparison between the first EPG data and the second EPG data. If it is recognized that the first EPG data are different from the second EPG data, the controller 740 may control the display unit 730 to display a message 1300 for identifying whether to update the first EPG data. In this case, the message 1300 may include a first indicator 1310 corresponding to a function for updating the first EPG data and a second indicator 1320 corresponding to a function for not updating the first EPG data.

The controller 740 may update the first EPG data in accordance with a first command to select the first indicator 1310.

For example, the controller 740 may update the first EPG data by receiving EPG data from at least one of the external server and the external display device communicatively connected with the mobile terminal of the present invention.

For another example, the controller 740 may update the first EPG data by using the second EPG data received from the external mobile terminal.

However, in accordance with the embodiment, the controller 740 may automatically update the first EPG data without displaying the message 1300 if the first EPG data are different from the second EPG data.

Meanwhile, the controller 740 may reject application of the group viewing reservation without updating the first EPG data in accordance with a second command to select the second indicator 1320. This is because that it is difficult to set the group viewing reservation if the first EPG data are not updated.

Meanwhile, according to one embodiment of the present invention, when a specific program according to group viewing reservation is displayed on the display device communicatively connected with the mobile terminal, identification information corresponding to the external mobile terminal which views the specific program may be displayed. This will be described in more detail with reference to FIG. 17.

Figure 17:
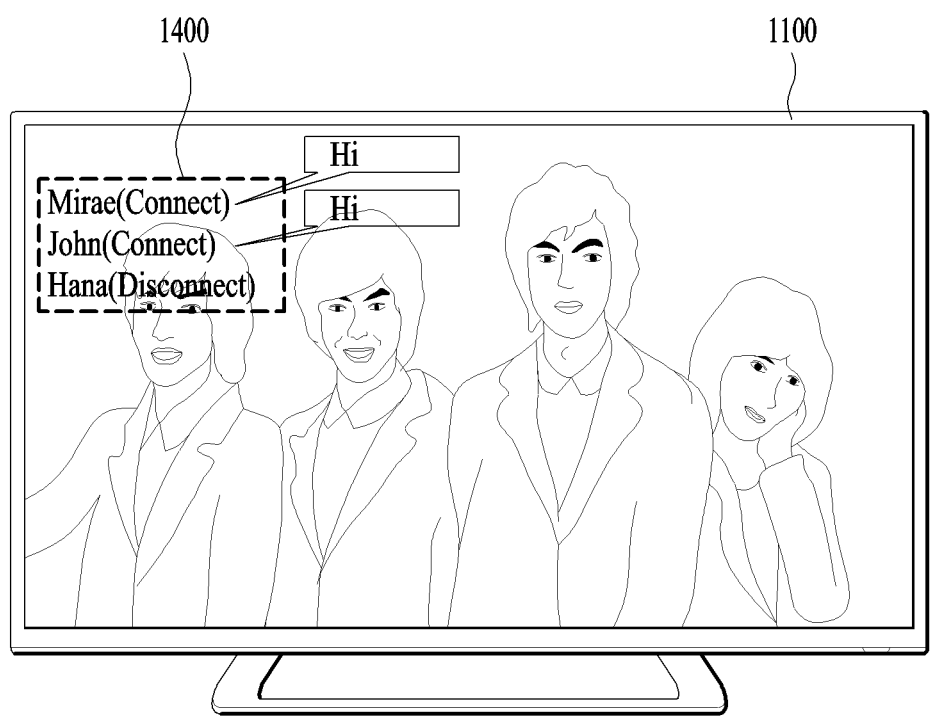
FIG. 17 is a view illustrating an example of a method for displaying identification information corresponding to an external mobile terminal which views a specific program when the specific program is displayed by an external display device communicatively connected with a mobile terminal according to one embodiment of the present invention.

FIG. 17 is a view illustrating an example of a method for displaying identification information corresponding to an external mobile terminal which views a specific program when the specific program is displayed by an external display device communicatively connected with a mobile terminal according to one embodiment of the present invention.

According to one embodiment of the present invention, the external display device 1100 communicatively connected with the mobile terminal may be at least one of the digital devices shown in FIGS. 2 and 4. In respect of this embodiment, it is assumed that the external display device 1100 communicatively connected with the mobile terminal is the digital device of FIG. 4.

The controller 470 of the display device 1100 may control the network interface unit 430 to be communicatively connected with the external mobile terminal. The controller 47 may control the network interface unit 430 to receive a signal for a viewing reservation of a specific program according to a group viewing reservation from the external mobile terminal. In this case, the signal for a viewing reservation may include identification information of at least one external mobile terminal related to the group viewing reservation.

The controller 470 of the display device 1100 may register the viewing reservation of the specific program in accordance with the signal for a viewing reservation.

The controller 470 may control the network interface unit 430 to transmit a signal indicating a start of the specific program to the external mobile terminal when the specific program in which the viewing reservation is registered starts within a preset time (for example, 5 minutes).

Meanwhile, if the specific program in which the viewing reservation is registered starts and a channel currently displayed on the display device 1100 is different from the channel through which the specific program is broadcast, the controller 470 may switch the current channel to the channel through which the specific program is broadcast. Meanwhile, if the specific program in which the viewing reservation is registered starts in a state that the display device 1100 is powered off, the controller 470 may turn on the display device 1100 and control the display unit 730 to display the specific program.

Meanwhile, referring to FIG. 17, the controller 470 may receive a signal for displaying the identification information of the external mobile terminal from the external mobile terminal. The controller 470 may control the display unit 480 to display identification of the mobile terminal of the user who currently views a specific program, on a predetermined area 1400 on the screen when receiving the signal.

In detail, the controller 470 may recognize whether another mobile terminals related to a group viewing reservation have been communicatively connected with the external display device 1100 and currently view the specific program through the mobile terminal communicatively connected with the display device 1100. The controller 470 may control the network interface unit 430 to receive information as to whether the external display device has been communicatively connected with another mobile terminals, through the mobile terminal communicatively connected with the display device.

For example, the controller 470 may display a text "connect" with respect to the identification information of the external mobile terminal which views the specific program of the mobile terminals related to the group viewing reservation and display a text "disconnect" with respect to the identification information of the external mobile terminal which does not view the specific program. However, icon may be displayed without limitation to the text.

Meanwhile, the controller 470 may display a message mutually transmitted and received between the plurality of mobile terminals related to the group viewing reservation, on the screen of the display device 1100. The controller 740 may control the display unit 480 to display the message on the screen in a transparent or semi-transparent type. That is, it is advantageous that the user may perform chatting with another user, who views a specific program, through TV screen.

According to this embodiment, it is advantageous that the user may know a user who currently views a specific program, while viewing a specific program in which a group viewing reservation is registered, and may easily perform chatting with persons who view a specific program, through TV screen.

According to at least one of the embodiments of the present invention, it is advantageous that the viewing reservation set for the specific program of the display device using the mobile terminal may be shared with another mobile terminal.

The mobile terminal and the control method therefor according to the present invention are not limited to the aforementioned embodiments, and all or some of the aforementioned embodiments may selectively be configured in combination so that various modifications may be made in the aforementioned embodiments.

Meanwhile, the operation method of the mobile terminal disclosed in this specification may be implemented in a recording medium, which may be read by a processor provided in the mobile terminal, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through the network, whereby codes that can be read by the processor may be stored and implemented in a distributive mode.

Although the description has been made with reference to the accompanying drawings in this specification, it will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A mobile terminal communicatively connected with a first external display device, the mobile terminal comprising:
   a memory for storing identification information corresponding to at least one external mobile terminal;
   a transceiver for receiving first electronic program guide (EPG) data from an external server or the first external display device;
   a display for displaying an EPG on the basis of the received first EPG data; and
   a controller,
   wherein the controller:
   controls the display to display identification information corresponding to the at least one external mobile terminal in accordance with a first command for reserving group viewing of a specific program from at least one program included in the EPG,
   transmits, to the first external display device, a signal for a first viewing reservation information of the specific program in accordance with the first command,
   controls the transceiver to transmit, to a first external mobile terminal corresponding to specific identification information, the first viewing reservation information of the specific program in accordance with a second command for selecting the specific identification information from the displayed identification information, and
   transmits, to the first external display device, a signal for displaying messages on the first external display device mutually transmitted and received between the mobile terminal and the first external mobile terminal related to the group viewing reservation, when the specific program is displayed on the first external display device.

2. The mobile terminal according to claim 1, wherein the controller controls the transceiver to transmit the first EPG data and an acknowledgement signal as to grant of a group viewing reservation to the first external mobile terminal in accordance with the second command and transmit the first viewing reservation information to the first external mobile terminal when a grant signal of a group viewing reservation is received from the first external mobile terminal.

3. The mobile terminal according to claim 1, wherein the controller controls the transceiver to transmit a signal for displaying the specific identification information to the first external display device.

4. The mobile terminal according to claim 1, wherein the controller controls the transceiver to transmit the signal for the first viewing reservation information of the specific program to a second external display device different from the first external display device in accordance with a third command.

5. The mobile terminal according to claim 1, wherein the controller controls the display to display a specific message for acknowledging whether to grant group viewing reservation when second EPG data and the acknowledgement signal as to grant of group viewing reservation are received from a second external mobile terminal.

6. The mobile terminal according to claim 5, wherein the controller updates the first EPG data if the first EPG data are different from the second EPG data.

7. The mobile terminal according to claim 5, wherein the controller controls the transceiver to transmit the grant signal of group viewing reservation to the second external mobile terminal in accordance with a fourth command to grant a group viewing reservation and receive second viewing reservation information from the second external mobile terminal.

8. The mobile terminal according to claim 7, wherein the controller controls the transceiver to transmit a signal for a viewing reservation of a program corresponding to the second viewing reservation information to the first external display device on the basis of the received second viewing reservation information.

9. The mobile terminal according to claim 7, wherein the controller stores a schedule generated based on the second viewing reservation information in the memory.

10. The mobile terminal according to claim 7, wherein the controller controls the transceiver to transmit identification information of the second external mobile terminal to the first external display device in accordance with the fourth command.

11. A control method for a mobile terminal, the control method comprising the steps of:
    being communicatively connected with a first external display device;
    receiving first electronic program guide (EPG) data from an external server or the first external display device;
    displaying an EPG on the basis of the received first EPG data;
    displaying identification information corresponding to at least one external mobile terminal, which is previously stored in a memory, in accordance with a first command for reserving group viewing of a specific program from at least one program included in the EPG, and transmitting, to the first external display device, a signal for a first viewing reservation information of the specific program;

transmitting, to a first external mobile terminal corresponding to specific identification information, the first viewing reservation information of the specific program in accordance with a second command for selecting the specific identification information from the displayed identification information; and transmitting, to the first external display device, a signal for displaying messages on the first external display device mutually transmitted and received between the mobile terminal and the first external mobile terminal related to the group viewing reservation, when the specific program is displayed on the first external display device.

12. The control method according to claim 11, wherein the step of transmitting, to the first external mobile terminal, the first viewing reservation information of the specific program in accordance with the second command for selecting the specific identification information from the displayed identification information includes transmitting the first EPG data and an acknowledgement signal as to grant of a group viewing reservation to the first external mobile terminal in accordance with the second command, and transmitting the first viewing reservation information to the first external mobile terminal when a grant signal of a group viewing reservation is received from the first external mobile terminal.

13. The control method according to claim 11, further comprising the step of transmitting a signal for displaying the specific identification information to the first external display device.

14. The control method according to claim 11, further comprising the step of transmitting the signal for the first viewing reservation information of the specific program to a second external display device different from the first external display device in accordance with a third command.

15. The control method according to claim 11, further comprising the step of displaying a specific message for acknowledging whether to grant a group viewing reservation when second EPG data and the acknowledgement signal as to grant of group viewing reservation are received from a second external mobile terminal.

16. The control method according to claim 15, further comprising the step of updating the first EPG data if the first EPG data are different from the second EPG data.

17. The control method according to claim 15, further comprising the steps of transmitting the grant signal of the group viewing reservation to the second external mobile terminal in accordance with a fourth command to grant the group viewing reservation and receiving second viewing reservation information from the second external mobile terminal.

18. The control method according to claim 17, further comprising the step of transmitting a signal for a viewing reservation of a program corresponding to the second viewing reservation information to the first external display device on the basis of the received second viewing reservation information.

19. The control method according to claim 17, further comprising the step of storing a schedule generated based on the second viewing reservation information in the memory.

20. The control method according to claim 17, further comprising the step of transmitting identification information of the second external mobile terminal to the first external display device in accordance with the fourth command.

* * * * *